(12) United States Patent
Anderson et al.

(10) Patent No.: US 9,736,540 B2
(45) Date of Patent: *Aug. 15, 2017

(54) SYSTEM AND METHOD FOR MULTI-DEVICE VIDEO IMAGE DISPLAY AND MODIFICATION

(71) Applicant: Disney Enterprises, Inc., Burbank, CA (US)

(72) Inventors: Hans C. Anderson, Stratford, CT (US); Aaron Thiel, Durham, CT (US); Li Shi, Avon, CT (US); Mathieu Morris, West Hartford, CT (US); Jeremiah Michael Swartz, North Branford, CT (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/299,820

(22) Filed: Oct. 21, 2016

(65) Prior Publication Data

US 2017/0041677 A1   Feb. 9, 2017

Related U.S. Application Data

(63) Continuation of application No. 14/723,982, filed on May 28, 2015, now Pat. No. 9,485,540.
(Continued)

(51) Int. Cl.
*G06F 3/00* (2006.01)
*G06F 13/00* (2006.01)
(Continued)

(52) U.S. Cl.
CPC ..... *H04N 21/47205* (2013.01); *G06F 17/241* (2013.01); *H04N 5/4403* (2013.01);
(Continued)

(58) Field of Classification Search
CPC ........... H04N 21/42204; H04N 21/472; H04N 21/478; G06F 3/0482; G06F 3/04845; G06F 17/241
See application file for complete search history.

(56) References Cited

U.S. PATENT DOCUMENTS

| | | | |
|---|---|---|---|
| 9,485,540 B2 * | 11/2016 | Anderson | H04N 21/47205 |
| 2014/0201264 A1 * | 7/2014 | Soon-Shiong | G06F 3/03 709/203 |
| 2015/0149906 A1 * | 5/2015 | Toff | G11B 27/031 715/723 |

* cited by examiner

*Primary Examiner* — Kyu Chae
(74) *Attorney, Agent, or Firm* — McCormick, Paulding & Huber LLP

(57) ABSTRACT

Methods and systems for allowing multiple devices to display and annotate (or modify) a video image are described, where a content renderer device displays a video image that is also displayed (or viewed) by one or more content viewer devices, which can both display and annotate (or modify) the same video image at the same time, and the content renderer selectively determines whether or not a GUI menu is displayed on its display screen. Annotation commands (e.g., screen touch data) on the viewer devices are captured, packaged and sent to the content renderer, which creates a combined modified video image having the annotations from the viewer devices, displays it to the renderer display and sends it to the viewer devices for display thereon. Also, the viewer device may selectively display video content from multiple other peer devices as a composite video image, may annotate (or modify) each displayed video content independently, and may send a screen video image, or a portion thereof, to any other peer device. Any peer device may operate as a content renderer or content viewer, or both, at any given time, and peer devices may be running different operating systems.

20 Claims, 13 Drawing Sheets

Related U.S. Application Data

(60) Provisional application No. 61/997,517, filed on Jun. 3, 2014.

(51) Int. Cl.
*H04N 21/472* (2011.01)
*G06F 17/24* (2006.01)
*H04N 5/445* (2011.01)
*H04N 5/44* (2011.01)
*H04N 21/478* (2011.01)
*H04N 21/4788* (2011.01)

(52) U.S. Cl.
CPC ........... *H04N 5/445* (2013.01); *H04N 21/478* (2013.01); *H04N 21/4788* (2013.01)

760 —

Master App Settings Options:

762 — ☐ Master App GUI Display/Control Menus
   763 — ☐ GUI Off for this device
   764 — ☐ GUI Location:
      765 { ☐ Left Side      ☐ Right Side
            ☐ Top            ☐ Bottom 766 — ☐ Local App GUI Display/Control Menus
   768 — ☐ GUI Off for this device 770 — ☐ On-Set Display Device? (Y/N)

772 — ☐ "Viewer" Windows Location/Format
        ☐ Icon on bottom      ☐ Window Tiles
   774 { ☐ Overlapping windows      ☐ Split Screen/Multi-Screen
        ☐ Local Input Split Screen

776 —

☐ Local App Windows Location/Format
        ☐ Icon on bottom      ☐ Window Tiles
   778 { ☐ Overlapping windows      ☐ Split Screen/Multi-Screen
        ☐ Same Screen as Viewer      ☐ Split Screen from Viewer

780 —

☐ "Renderer" Attributes
   782 { ☐ Entire Screen      ☐ Selected portion of Screen
        ☐ Without GUIs      ☐ Prompt for selection each time

784 —

☐ "Send to" Attributes
        ☐ Entire Screen      ☐ Selected portion of Screen
   786 { ☐ Without GUIs      ☐ Prompt for selection each time
        ☐ Send Screen Image      ☐ Send Content Tree

788 —

☐ Degrees/Levels of touch propagation
        ☐ One level
   790 { ☐ Multi-Level
        ☐ 2      ☐ 3      ☐ Other ___

792 —

☐ Peer Directory Display attributes
   793 — ☐ Location of list
      794 { ☐ Left Side      ☐ Right Side
            ☐ Top           ☐ Bottom
   795 — ☐ Default Label includes:
        ☐ App Name      ☐ Image screen location
      796 { ☐ User/Talent Name      ☐ Device Type
        ☐ Image content summary

*FIG. 9*

SYSTEM AND METHOD FOR MULTI-DEVICE VIDEO IMAGE DISPLAY AND MODIFICATION

CROSS REFERENCE TO RELATED APPLICATIONS

This application is a continuation of U.S. application Ser. No. 14/723,982, filed May 28, 2015 which claims the benefit of U.S. Provisional Application No. 61/997,517, filed Jun. 3, 2014, the entire disclosures of which are incorporated herein by reference to the extent permitted by applicable law.

BACKGROUND

It is common for "on-air" displays or screens showing video content, such as those shown on television or internet sports shows, to be controlled by "on-air" talent using large touch screens as the on-air display. This provides a good viewer experience because the viewer is able to see a combination of talent comments and graphics and allows the talent to interact with the graphics, and also leads to more dynamic programming possibilities.

However, using such large on-air touch screens also leads to problems that may diminish the viewer's experience and make the job of the on-air talent more difficult. Such problems include one or more of the following: The talent must turn his/her back to the camera in order to interact with the "on air" touch screen; either having unattractive or distracting GUI control menus displayed on the on-air display, or not having a visible GUI menu on the on-air display and having severe limitations in the manner of control or interaction the talent can have with the on-air display; touch displays cannot associate touch points with specific users making it difficult for multiple talent users to simultaneously interact with and control the "on air" display content; and talent interaction with and control of display content that are not controllable by touch (or are not readily accessible), is not possible.

Systems for displaying content from one device on the display of another device, as well as interactive sharing of software applications, are known in the art. For example, video conferencing, remote desktop, remote administration, screen sharing, and web conferencing all involve displaying images on screens of multiple devices simultaneously, with some level of interactivity. In interactive sharing of software applications, images from an application on one user device may be directly shared with another user device, including annotations made on the image by a user of the first device. These systems do not, however, provide a solution for the problems set forth above regarding on-air displays and similar applications.

Accordingly, it would be desirable to have a system or method that overcomes the limitations and problems of the current approaches, that, among other potential benefits, makes it easier for talent to interact with and control "on-air" display content to improve programming possibilities and the viewer's overall viewing experience.

BRIEF DESCRIPTION OF THE DRAWINGS

FIG. 9 is a screen illustration of a settings screen for setting options for the Master App software, in accordance with embodiments of the present disclosure.

DETAILED DESCRIPTION

As set forth in more detail below, the present disclosure is directed to methods and systems for allowing multiple devices to display and modify a displayed video image or content. In particular, it allows multiple users to view and modify (or "telestrate" on) the same video image provided from a software application (or interact with the same software application) at the same time from multiple different devices. The devices may also be running different operating systems (or different versions thereof) and use different user control interfaces for modifying or interacting with the image or software application.

It also provides the ability for any device to selectively display inputs (e.g., images, videos, content) from multiple different input sources on one display screen, to create a collection (or collage) of images provided from software applications on the screen, to interact with each of the images independently or collectively, or to send the collection (or portion thereof) to any other enabled device on the network (have the other device view it).

Thus, the present disclosure allows multiple TV commentators each using different devices to, among other things, simultaneously modify a displayed video image which is being broadcast.

For example, when a video clip is being broadcast and two commentators, John and Jack, both want to illustrate on the same video clip being shown on their tablets, the illustrations by John and Jack both appear in realtime on the combined image on the TV broadcast screen.

Figure 1:
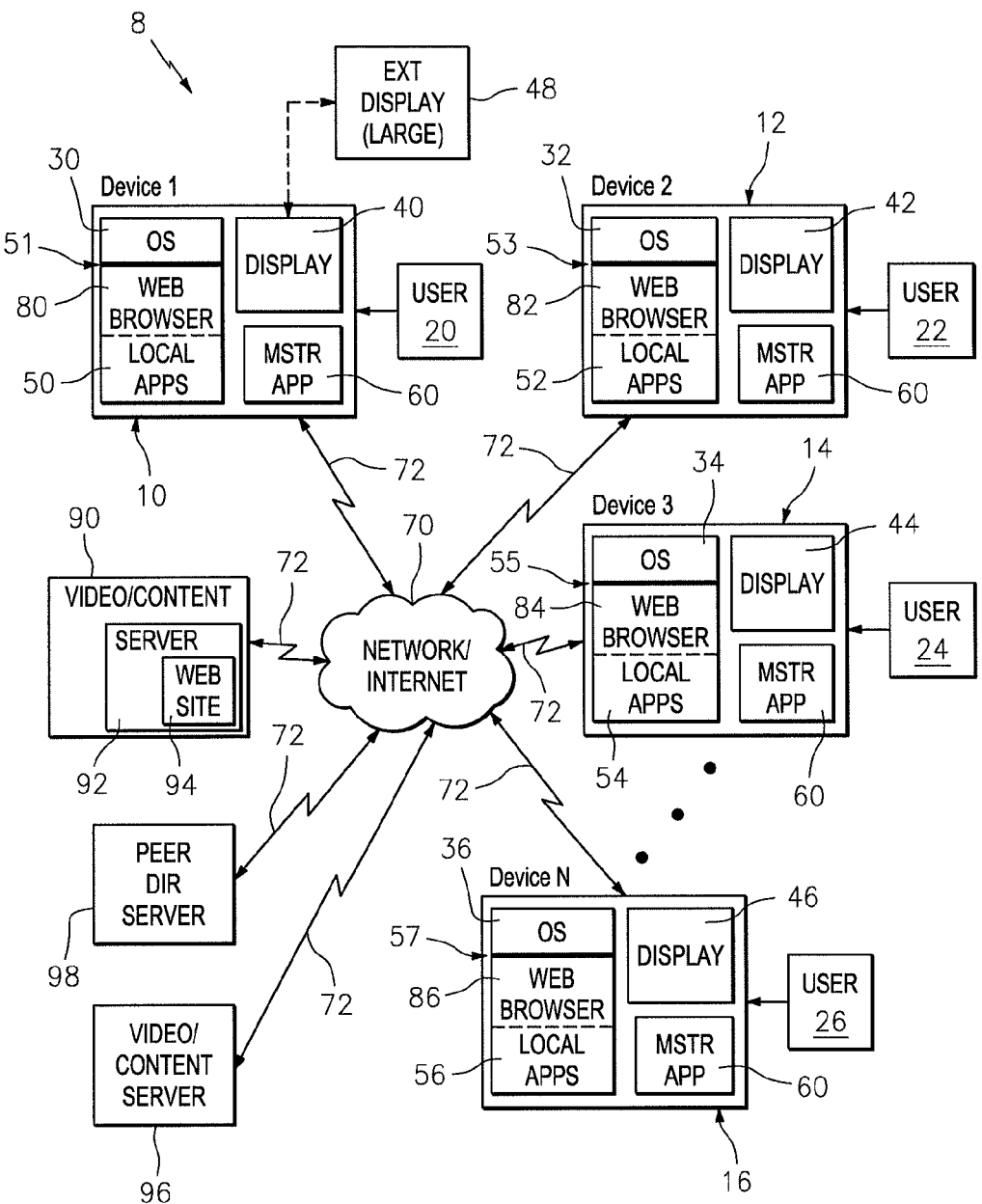
FIG. 1 is a block diagram of the components of a system, in accordance with embodiments of the present disclosure.

Referring to FIG. 1, various components of an embodiment of an interactive multi-device image display and modification system 8, includes a plurality of computer-based devices 10,12,14,16 (Device 1 to Device N) which interact with each other and with respective users 20,22,24, 26 (or talent, or on-air talent, or commentators) each user being associated with one of the devices 10-16. Each of the computer-based devices 10-16 includes a respective local (or host) operating system (or OS) 30,32,34,36 running on the computers of the respective devices 10-16. Each of the devices 10-16 also includes a respective display screen 40,42,44,46 that interacts with the operating system 30-36 and any hardware or software applications, video drivers, interfaces, and the like, needed to display the desired content on the respective display 40-46. The users 20-26 interact with the respective devices 10-16 and may provide inputs to the devices to create or modify images or content on the displays 40-46 of the respective devices 10-16.

The computer-based devices 10-16 may also include local (or host) software applications 50-56 (or apps), running on, and interacting with, the respective operating systems 30-36 for the respective devices 10-16, which receive inputs from the users 20-26 and provides video content to the displays 40-46. The local apps 50-56 may be customized software applications designed for the particular device or operating system they are running on, or more generic applications capable of running on various devices or operating systems, discussed more hereinafter. Also, the operating systems 30-36 may be the same as or different from each other. In addition, the operating systems 30-36 and local software applications 50-56 of the devices 10-16 may be collectively shown as numerals 51,53,55,57, respectively.

Each of the computer-based devices 10-16 may also include a local "Master" software application 60 (or "Master App"), running on, and interacting with, the respective operating system 30-36, which may receive input from the users 20-26 or the devices 10-16 and provides video content to the displays 40-46, discussed more hereinafter. The Master App 60 is a platform (or operating system) agnostic peer-sharing 'wrapper' software application that allows multiple types of devices to see (or view) and control each other, and that sends and receives video and touch information and data to and from the other devices running the Master App 60. Each of the user devices 10-16 may run the same common Master App 60 sharing application, regardless of the type of device (or computer, or software, or operating system) running the Master App, as discussed more hereinafter.

The devices 10-16 may be connected to or communicate with each other through a communications network 70, such as a local area network (LAN), wide area network (WAN), virtual private network (VPN), peer-to-peer network, or the internet, as indicated by lines 72, by sending and receiving digital data over the communications network 70. If the devices 10-16 are connected via a local or private or secured network, the devices 10-16 may have a separate network connection to the internet for use by the device web browsers 80-86.

The devices 10-16 may also each have a web browser 80,82,84,86, which may also be one of the local apps 50-56. The browsers 80-86 allow the devices 10-16 to connect to or communicate with the internet to obtain desired content in a standard client-server based configuration, such as from an internet-based video/content provider 90 (or vendor or supplier or merchant or reseller or distributor). The video/content provider 90 may be an entity that sells or otherwise provides images or content for use by the devices 10-16 from a video/content provider website 92, which is implemented using one or more physical computer servers 94. The users 10-16 use the web browser 80-86 as a user interface to view or communicate with the video/content provider website 94 that is displayed on the displays 40-46 of the computer-based devices 10-16 allowing the users to interact with the video/content provider website 94.

The devices 10-16 may also have local digital storage located in the device itself (or connected directly thereto, such as an external USB connected hard drive, thumb drive or the like) for storing data, images, video content, video clips, documents, and the like, which may be accessed by the local apps running on the device.

In addition to, or instead of, self-contained or local displays 40-46 (such as that used with a tablet or laptop), the devices 10-16 may interact with and display content on an external display 48, which may be a large display such as a jumbotron, large projection display, or any other external display. In one embodiment, the external display may be an "on-set" or "on-air" display screen, such as that used in a television or on-line production studio or other environment, as discussed more hereinafter. The external display may be a "dumb" display that receives video signals and displays them on the screen, or an interactive (e.g., touch or input control enabled) display, which is able to receive touch inputs (or other control inputs) from the user and provide touch data back to the device driving the external display.

In addition, the computer-based devices 10-16 may also communicate with a separate video/content computer server 96 via the network 70 as indicated by the line 72. The video/content server 96 may have desired video clips or other content desired to be used by the devices 10-16 stored on the server 96.

The devices 10-16 may also communicate with a peer directory computer server 98 (or peer server) via the network 70 as indicated by the line 72. The peer server 98 may be any type of computer server with the necessary software or hardware (including storage capability) for performing the functions described herein. Also, the peer server 98 (or the functions performed thereby) may be located in a separate server on the network 70, or may be located, in whole or in part, within one (or more) of the devices 10-16 on the network 70. The peer server 98 may have an accessible list of which of the devices 10-16 (or peers) on the system 8 connected to the network 70 are running the "Master App" software 60, and may also identify the local or other software applications each of the devices 10-16 is running, as discussed herein. The peer directory server 98 may also have software for monitoring when devices connect to and drop-off the network 70. When a device running the Master App (or a Master-loaded device or a peer device) connects to the network 70, that device can detect (or "see") all other peer devices on the network 70 available for connection, via the Peer Directory List, provided by the peer directory server 98, discussed more hereinafter.

In particular, the software for monitoring may also be referred to as a "discovery" service software, or Monocle software. Alternatively, the Monocle software may be located in the separate server as shown in FIG. 1, or may be installed in one of the devices 10-16. Only a single instantiation of the Monocle software is needed on a single device connected to the network. The Monocle software operates like a directory or "chat room" by publishing device ID's and connection availability for all devices on the network that can be connected to or through the Master application software. For example, when a Master-loaded device (or peer device) connects to the network or system, once it has been validated as a peer, is able to "see" all other peers on the network available for connection by viewing the peer directory, discussed more hereinafter. Any other type of software or hardware logic may be used to detect when a device connects to or drops-off the network 70.

Figure 2:
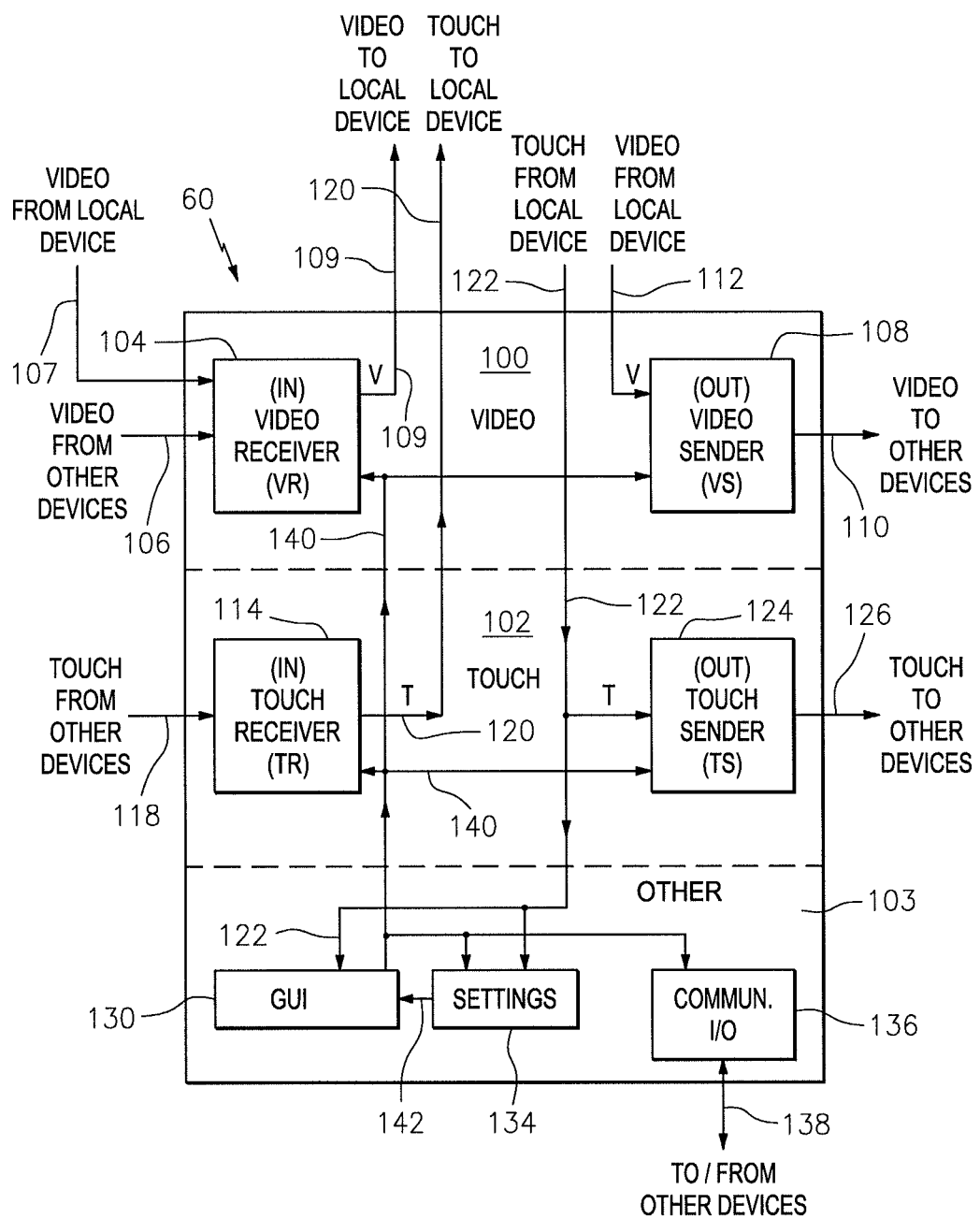
FIG. 2 is a block diagram of the Master software application (Master App) showing various components thereof and possible interactions therebetween, in accordance with embodiments of the present disclosure.

Referring to FIG. 2, the "Master App" software 60 (FIG. 1) is a platform (or operating system) agnostic peer-sharing 'wrapper' software application running on the user devices that allows multiple types of peer devices on the network 70 (FIG. 1) to see and control each other, independent of the type of device the Master App is running on. More specifically, the Master App software 60 may be viewed as having a video processing logic section 100 and a touch (or control) processing logic section 102, and "other" processing logics section 103.

The video section 100 has video receiver processing logic 104, which receives video content data from other Master-loaded devices on the network 70, on line 106 and may also receive video content data from its local device on a line 107. The video receiver processing logic 104 also provides video content data to the local device (e.g., operating system or software apps) on a line 109. The video section 100 also has video sender processing logic 108, which receives video data from its local device on a line 112 and processes (or formats) and sends (or streams) video content data to other Master-loaded devices on the network 70, on a line 110.

The touch processing logic section 102 has touch receiver processing logic 114, which receives and conditions touch data (or raw touch data) on a line 118 from other Master-loaded devices on the network 70, and provides conditioned (or converted) touch data that is compatible with the operating system or software apps on the local device on a line 120. The touch processing logic section 102 also has touch sender processing logic 124, which receives touch data from the operating system or software apps on the local device and packages and sends the local touch data on a line 126 to the Master-loaded device(s) on the network 70 that sent the video being touched, discussed more hereinafter.

The "other" processing logics section 103 has Master App graphic user interface (GUI) logic 130, settings logic 132 and communication input/output (I/O) logic 134. The Master App GUI logic 130 detects local device display user touches on the line 122 and provides data or commands on a line 140 for processing and response as needed by the Master App software 60, such as the video receiver logic 104, the video sender logic 108, the touch receiver logic 114, the touch sender logic 124, the settings logic 134, the Communication I/O logic 134, or other portions of the Master App software 60, as needed for the Master App software 60 to perform the functions described herein. The GUI logic 130 also provides data, status or commands to display (or not display) the desired GUI (Master App GUI or Local App GUI) for the local device user, as described herein. The GUI logic 130 may also interact directly with the local operating system, local software applications or other portions of the Master App software as needed for the Master App software 60 to perform the functions described herein.

The Master App Settings logic 134 receives the setting options selections for the Master App software for the local device from the user and the GUI logic 130 and updates and stores the settings on the local device (or the network 70) for use by the Master App 60 and provides the setting selections to the GUI logic 130 on a line 142 as needed for the Master App to perform the functions described herein. Also, the Communications I/O logic 136 creates, sends, receives, or interprets Master App 60 commands and messages to and from the other Master-loaded devices on the network 70 (FIG. 1) on a line 138 and receives data, status or commands from the GUI logic 130 as needed for the Master App to perform the functions described herein.

The Master App software 60 may be designed so that the individual devices 10-16 (FIG. 1) do not need separate customized versions of the Master App 60 in order to provide output data to or control of the local software applications (local apps) 50-56 (FIG. 1) running on each of the devices 10-16, and to send or receive data and commands to/from other peer devices, and respond accordingly to provide the functions described herein. Each copy (or instantiation or image or version) of the Master App 60 running on each of the devices 10-16 determines what type of device and operating system it is running on and executes the relevant routines adapted for that device accordingly in order to communicate with the operating system or the local applications running on the device. Instead of using the Master App software application 60 as described herein, any other type of peer-sharing software application may be used provided it provides the functions described herein.

Figure 3:
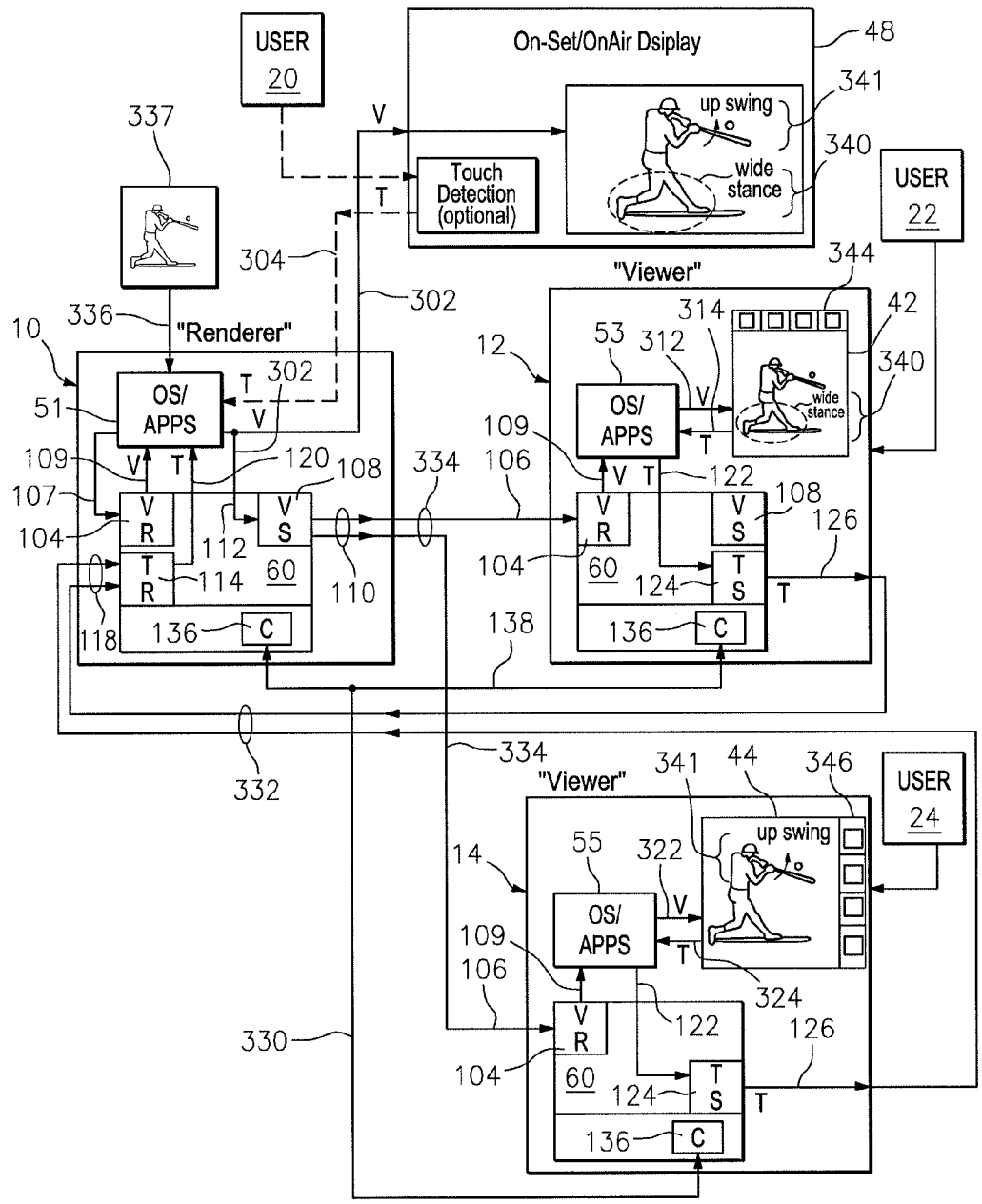
FIG. 3 is a block diagram showing three peer devices running the Master App software, one acting as a content renderer and the other two acting as content viewers, in accordance with embodiments of the present disclosure.
Figure 4:
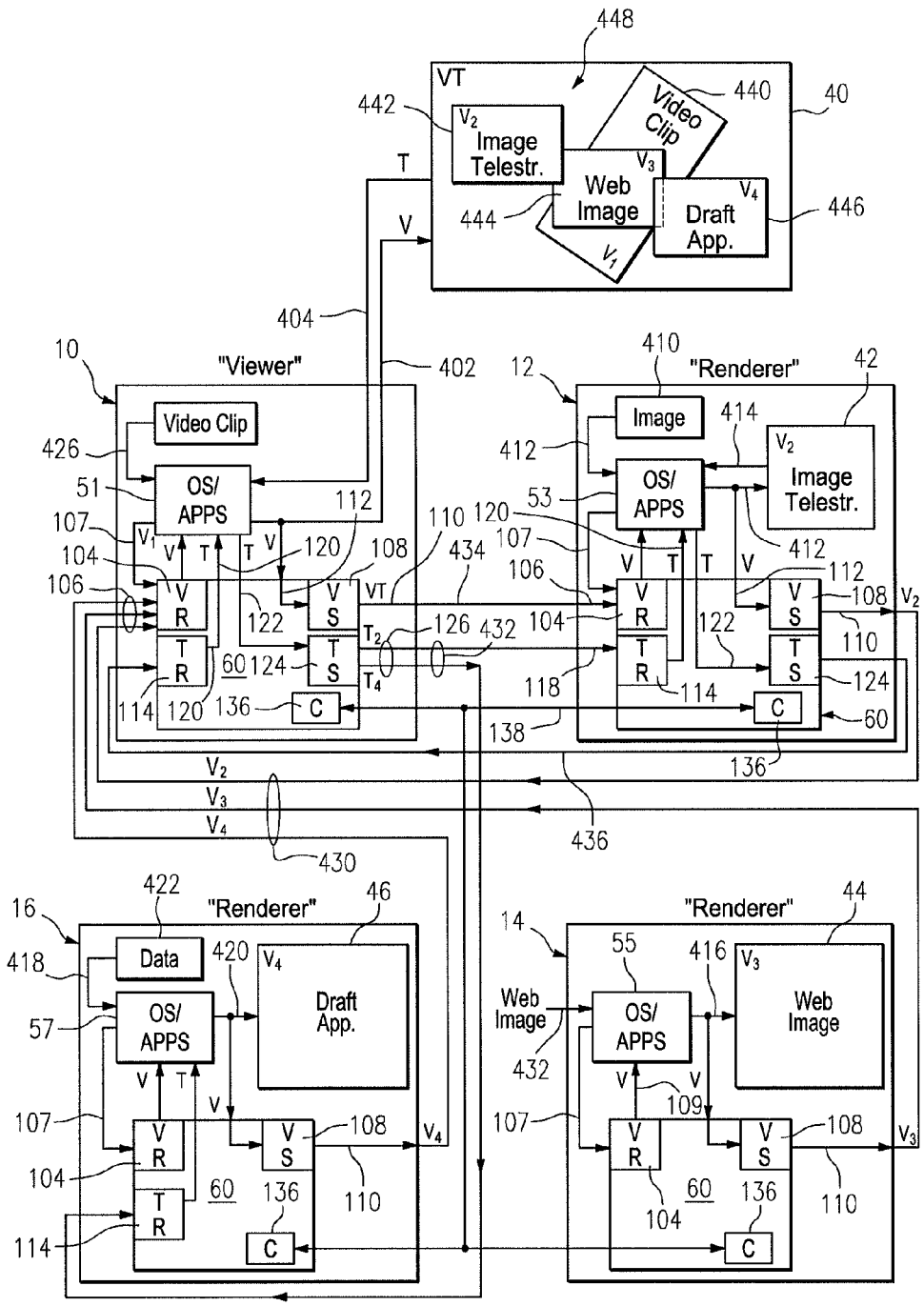
FIG. 4 is a block diagram showing four peer devices running the Master App software, which, in one example, one is acting as a content viewer and the other three are acting as content renderers, in accordance with embodiments of the present disclosure.

Referring to FIGS. 3 and 4, the Master App 60 may operate (or run) in two different "roles" or "modes." One mode is a content "viewer," where the local device receives and displays content provided (or rendered) by another peer device. The other mode is a content "renderer," where the local device displays video content provided (or rendered) from the local device itself and broadcasts (or renders) the video content to any other peer devices that request to view the content. The Master App 60 running on a given device may also run as both a content viewer and content renderer simultaneously (e.g., on different portions of the local screen), discussed further herein with FIG. 4. In addition, for a given configuration of devices in the system 8 (FIG. 1), the Master App 60 running on any given device at any given time may operate as a content renderer or a content viewer, depending on the commands from the users of the various peer devices running the Master App 60.

More specifically, when the Master App 60 is operating as a content "viewer," the video receiver logic 104 in the Master App 60 receives video content (or video streams) from another Master-loaded (or peer) device, formats the video content as needed (e.g., size, resolution, and the like) for use on the local display and local operating system and provides the video content to the local operating system or software application for the local display. In addition, in the "viewer" mode, touch events on the local device display screen are captured (or intercepted) by the Master App 60 prior to being acted upon by the local operating system or software applications, and are encoded and bundled (or packaged) by the touch sender logic 124 and sent to the source of the video (i.e., the content renderer device).

When the Master App 60 is operating as a content "renderer," the video sender logic 108 in the Master App 60 sends the video content (or video streams) being displayed by the local display, to another Master-loaded (or peer) device that has requested to view the content. The video sender logic 108 may also reformat the video content for the receiving device before sending, as discussed hereinafter. In addition, in the content "renderer" mode, the touch receiver logic 114 receives touch data from the other Master-loaded devices that are viewing the content, and formats the touch data as needed (e.g., mouse clicks, finger swipes, and the like) for the local display, local operating system and local software applications running (as needed). In addition, the video receiver logic 104 may receive the video content from the local operating system or software application and may reformat the video content as needed to provide Master App GUI or Local App GUI display information or any other video modifications, telestrations, enhancements or effects to the video to be performed by the Master App 60 prior to being displayed locally, and the reformatted video signal on the line 109 is provided to the operating system or local software app for display on the local device.

Referring to FIG. 3, three peer devices 10,12,14, each running the Master App 60, are shown operating as a content renderer (device 10) and content viewers (devices 12 and 1414), respectively. In particular, to create this configuration, the Communications I/O Logic 136 in the Master App 60 in the devices 12,14 each sends a "view request" message to the device 10 across the network 70 (FIG. 1) on the line 138 in response to the users 22,24 selecting the device 10 to view. After validating the view request, the video sender logic 108 in the Master App 60 of the content renderer device 10 sends (or renders) on the lines 110 the video content being displayed on the display screen 48 of the device 10 to the peer devices 12,14 that requested to view the video content, via the network 70 (FIG. 1) on the lines 334.

More specifically, the local operating system and local software applications (OS/Apps) 51 may receive the video content 337 on a line 336 from an external source, e.g., the internet or the network 70 (FIG. 1), and, for example, is running a video Telestration software application (Telestration App), which is a custom software application that allows for the viewing of a video image and provides the ability to illustrate (or "telestrate") on top of the image. In that case, the OS/Apps logic 51 provides a local video output signal on the line 107 from the Telestration App, which is provided to the video receiver logic 104, which adds or removes the desired graphic user interfaces from the display (e.g., the Master App GUI or the Local App GUI) and performs any other formatting needed to be performed by the Master App 60 prior to being displayed, and provides a formatted video signal back to the OS/Apps logic 51 for display. The OS/Apps logic 51 provides the formatted video output signal on a line 302 to the local display 48, e.g., a large external display or on-set display. The OS/Apps logic 51 also receives and responds to optional touch input data (if any) from the display 48 on a line 304.

The video output signal on the line 302 is also fed to the video sender logic 108 of the Master App 60, which may condition the video content data based on the device receiving of the video and which adds or removes the desired graphic user interfaces from the display (e.g., the Master App GUI or the Local App GUI) and performs any other formatting desired by the Master App 60 before sending the video content to the other peer devices that requested to view the content.

Also, the touch receiver logic 114 receives input touch data from the content viewer devices 12,14 on the lines 118 indicative of any screen touches (or control inputs or user inputs) performed by users 22,24 of the display screens 42,44 of the devices 12,14. The touch receiver logic 114 receives and interprets the touch (or control or user) information or data from other peer devices and converts it (as needed) to commands that are usable for the local operating system and local apps on the local device and are then provided on a line 120 to the OS/Apps 51 for use on the local operating system and local apps, e.g., the Telestration App in this example.

For the content "viewer" device 12, video content (or data or image) is received on the line 334 from the network 70 (FIG. 1) from the content "renderer" device 10, which is provided on the line 106 to the video receiver logic 104 which adjusts formatting, adds or removes any desired graphic user interfaces from the display (e.g., the Master App GUI or the Local App GUI) and performs any other formatting (or compilation as applicable, as discussed hereinafter) desired to be done by the local Master App 60 prior to being displayed on the local display 42. The reformatted video signal is provided on the line 109 to the OS/APPS logic 53 for display on the local device. The OS/Apps logic 51 then provides a video output signal on a line 312 to the local display 42 and receives touch input data from the display 42 on a line 314. The touch (or control or user) input data from local device display on the line 314 is intercepted (or captured or diverted) by the Master App 60 prior to being acted upon by the local OS/Apps 53 and is provided on the line 122 to the touch sender logic 124 which packages the touch data and sends it on the line 126 to the content renderer device 10 that was the source of the video content received on the line 106.

As discussed further herein, the format of the touch or user input data sent by the touch sender logic 124 may vary depending on the types of peer devices on the network and the type of touch receiver logic 114 used by the content renderer. In one embodiment, the touch data sent may be basic "state" data information (or touch input data) indicating that a touch or other user input has occurred and the location of the touch. In other embodiments, the touch sender logic 124 may convert the basic state data into a common input language (e.g., TUIO (Tangible User Interface Objects), or the like) that is sent and interpreted by the content renderer devices into commands or events for use on any operating system. In still other embodiments, the touch sender logic 124 may convert the basic state information into a high level command or event (e.g., button A pressed), which may be sent to the content renderer for interpretation and action.

In some embodiments, the Master App in the content renderer 10 may also send a request to the viewer devices 12,14 to send its local touch data to the content renderer 10. In that case, the request to the viewer devices 12,14 may be to only send touch data (or other user input data) originating in certain regions of the viewer device's screen 42,44 that correspond to regions the content renderer 10 would convert to actions.

Similar signal processing logic occurs for the other "viewer" device 14, where the peer device 14 has requested via the communication logic 136 to view content from the other peer device 10, which is acting as a content "renderer." In that case, the device 14 receives the video content from the device 10 on the line 334 from the network 70 (FIG. 1) and is provided on the line 106 to the video receiver logic 104 of the Master App 60 running on the "viewer" device 14. The video receiver logic 104 provides a formatted video content signal on the line 109 to the OS/Apps logic 55, which provides a video content data on a line 322 to the display 44 and receives touch data on a line 324 from the display 44. The touch data from local device display 44 on the line 324 is intercepted by the Master App 60 prior to being acted upon by the OS/Apps 53 and is provided on the line 122 to the touch sender logic 124 which packages the touch data and sends it to the content renderer device 10 that was the source of the video content.

As discussed hereinabove, the content renderer 10 receives on the lines 332 the touch inputs from the viewer devices 12,14 to the lines 118 for the Master App 60 running on the device 10 and formats these remote touches so that the operating system and applications of the local device 10 can replicate the touch effects from each of the viewer devices 12,14 onto the video content provided for the specific software application running (e.g., the video Telestration App) to the display 48, as well as send touch-updated video content back to the peer "viewer" devices 12,14 for display on their respective displays 42,44. The lines 138, 330, 332, 334 represent content transfer or communication between the devices 10-14 may all be done over the network 70 (FIG. 1), and are shown as separate lines for illustrative purposes.

For example, referring to FIG. 3, the external video content received by the Content Renderer on the line 336 may be a "clean image" 337, e.g., a batter swinging a baseball bat and hitting a ball. The users 22,24 of the devices 12,14 may be two on-air talents (e.g., Talent 1 and Talent 2, respectively) and the devices 12,14 may be touch-enabled tablets (such as an iPad® or the like). In this case, the devices have both selected to view the device 10, which is running the video telestration app, which is displaying the clean video image 337. Accordingly, the device 10 is "rendering" the clean image 337 to its local display 48 and to the devices 12,14, which are initially both "viewing" the clean image 337.

Then, for example, the users 22,24 may begin annotating (or telestrating on or modifying) the images displayed on their respective tablets 12,14 to create and share annotated (or telestrated or modified) composite images, as described herein. In particular, first, the user 22 (e.g., on-air Talent 1) on the device 12 may annotate (or telestrate) on the "clean image" 337 with a circular shape and the words "wide stance" written nearby to indicate his comments on the batter's stance, indicated as telestration 340. The resulting composite telstrated image is the composition (or combination) of the clean image 337 and the telestration 340, which is referred to herein as Telesration1. To create Telesration1, as discussed herein, the touch data associated with the telestration 340 are bundled by the device 12 Master App 60 and sent to the device 10 (content renderer) where the Master App 60 updates the display 48 to show the Telestration1, and also sends Telestration1 to the devices 12,14 which is displayed on the displays 42,44, respectively.

Next, the user 24 (e.g., on-air Talent 2) on the device 14 may annotate (or telestrate) on the Telestration1 image to add an up-arrow and the words "up swing" written nearby, to indicate the user's comments on the batter's swing, indicated at telestration 341. The resulting composite telstrated image is the composition of the Telsration1 image and telestration 341, referred to herein to as Telestration2. To create Telestration2, as discussed herein, the touch data associated with the second telestration 341 are bundled and sent to the device 10 (content renderer, touch receiver logic) where the Master App 60 updates the display 48 to show the Telestration2, and also sends the updated Telestration2 to devices 12,14 which is displayed on the displays 42,44, respectively. In addition, the content renderer device 10 renders the composite telestrated images Telestration1 and Telestration2 on the displays 42,44, with the desired GUI control menus 344,346, respectively, e.g., the local apps GUIs, as described herein, and also provides Telestration1 and Telestration2 on the On-Air Display 48, which, as discussed herein, includes the clean image 337 and the annotations 340,341 from both the user devices 12,14, respectively, without any GUI menu controls.

It should be understood that the system response time (or the latency time or delay time or system processing time) between when the users touch their screens 42,44, and when the combined modified (or annotated or telestrated) image appears on the on-air display 48 as well as back to the displays 42,44 of the respective user devices 12,14, is fast enough such that it is not detectable or noticeable by the users or on-air talent (e.g., less than one second). Other latency times may be used if desired, provided it is acceptable for on-air use or for the specific use application. More specifically, the latency time for the touch command at the local user devices 12,14 to be intercepted, packaged/encoded, and sent to another peer device 10 (content renderer) which receives, unpacks, reformats for its local operating system/application, causes the local system to execute the touch commands, and sends the resulting composite image back to the local user devices 12,14, is not detectable by the users or the viewers (or is acceptable for on-air use).

Three performance criteria that are typically balanced in video broadcasting are bandwidth (or sample frame rate or frame update rate), video quality (or resolution), and latency (the time it takes to respond to input commands). We have found that optimizing the performance criteria for minimum latency was important to obtain the desired on-air performance for the system. Accordingly, in one embodiment, the resolution of the video images sent to the on-air display 48 (FIG. 3) may be high, while the resolution of the video images provided to the user devices 12,14 (FIG. 3) may be lower. Thus, the renderer 10 (FIG. 3) may provide the images to the displays 42,44 of the other user devices 12,14 (FIG. 3) at a lower resolution than that provided to the on-air display 48. This enables the system to provide the desired latency response time between touch inputs and visual effect seen on the local user devices screens as well as the on-air display screen.

Also, to reduce response latency, the system may be configured with a network topology that minimizes communication time, such as a peer-to-peer network configuration. In that case, the peer devices communicate directly to each other, and not through a separate server (as in a client-server or hub-and-spoke configuration). This reduces the communication time between devices, thereby reducing the response latency.

In addition, the users 22,24 may modify (or annotate or telestrate) the image on their respective displays 42,44 at the same time and have the modifications processed and displayed simultaneously (i.e., within the update rate of the video "frames," e.g., 16 milliseconds), and the content renderer device 10 rapidly processes (either sequentially or in parallel) each packaged touch data message received from the other peer devices 12,14 and sends the corresponding touch commands to its operating system/local application (OpSys/App) to respond to the touch commands sent from the other peer devices 12,14, such that the users or on-air talent do not detect any latency. If the application on the content renderer is a true multi-touch application, the application can simultaneously handle more than three touch inputs' data from the multiple touch input devices.

Referring to FIG. 4, four peer devices 10,12,14,16 each running the Master App 60, are shown operating as a content viewer (device 10) and three content renderers (devices 12,14,16). In particular, to create this configuration, the communication logic 136 in the Master App 60 running on the device 10 sends a "view request" message to the devices 12,14,16 across the network 70 (FIG. 1) on the line 138. In response, after validating the request, the video sender logic 108 in the Master App 60 running on each of the content renderer devices 12,14,16 sends (or streams) the video content being displayed on the displays 42,44,46 of the respective devices 12,14,16 to the peer device 10 that requested to view the video content, across the network 70 (FIG. 1) on lines 430, to the video receiver 104 of the viewer device 10.

In that case, each of the renderer devices 12,14,16 is running its own software application that is generating a video content displayed on its local device displays 42,44, 46. For example, the device 12 is displaying an image and running the video Telestration App on the OS/Apps logic 53 and displaying the content V2 on the display 42, the device 14 is running its internet web browser and displaying a web image V3 from a website, and the device 16 is running a custom software application called the "Draft App", which displays an image V4 of sports team logos in a table format on the screen and allows users to select which sports teams will draft in which rounds, by dragging and dropping team logos into the desired numbered draft round.

For the renderer device 12 rendering the video clip, the video Telestration App in OS/Apps logic 53 receives the image content V2 from a local storage device 410 (e.g., a hard drive, or other storage device) on the renderer device 12, which is provided on a line 412 to the OS/Apps logic 53 to run the video Telestration App. The OS/App 53 provides the video content for the app on a line 107 to the video receiver logic 104 in the Master App 60, which provides the formatted video back to the OSS/App 53 for display on the display screen 42 on the line 109. The OSS/App 53 then provides the image V2 to the display 42 on a line 414, and also provides it to the video sender 108 for processing and sending the image V2 on the line 110 to the "viewer" peer device 10 via the network 70 on the lines 430.

Similarly, for the renderer device 14 rendering the web image, the web browser in OS/Apps logic 55 receives the web image content on a line 432 from the network 70 (FIG. 1), and is running a web browser application. The OS/App 55 provides the video content for the app on the line 107 to the video receiver logic 104 in the Master App 60, which provides the formatted video back to the OSS/App 55 for display on the display screen 44 on the line 109. The OSS/App 55 then provides the web image content V3 to the display 44 on a line 416, and also provides it to the video sender 108 for processing and sending the image V3 on the line 110 to the "viewer" peer device 10 via the network 70 (FIG. 1) on the lines 430.

Similarly, for the renderer device 16 rendering the Draft App content, the Draft App in OS/Apps logic 57 receives the needed data for the Draft App from a local storage device (e.g., a hard drive, or other storage device) 422 on the renderer device 16, which is provided on a line 418 to the OS/Apps logic 57 to run the Draft App. The OS/App 57 provides the video content for the app on the line 107 to the video receiver logic 104 in the Master App 60, which provides the formatted video back to the OSS/App 57 for display on the display screen 46 on the line 109. The OSS/App 57 then provides the Draft App content V4 to the display 46 on a line 420, and also provides it to the video sender 108 for processing and sending the image V4 on the line 110 to the "viewer" peer device 10 via the network 70 (FIG. 1) on the lines 430.

In addition to viewing the other peer devices 12,14,16, the viewer device 10 may also view content provided from its own local device application(s). For example, the OS/Apps logic 51 may be running a Video Clip Viewer software application and displaying the contents of the selected video clip. In that case, the Clip Browser app in OS/Apps logic 51 receives the needed video clip for the application from a local storage device (e.g., a hard drive, or other storage device) 424 on the viewer device 10, which is provided on a line 426 to the OS/Apps logic 51 to run the Video Clip App. The OS/App 51 provides the video content V1 for the app on the line 107 to the video receiver logic 104 in the Master App 60 for processing and display on the local display with the other video inputs on lines 106. The video receiver logic 104 provides the formatted combined video back to the OSS/App 51 for display on the local display screen 40 on the line 109. The OSS/App 51 then provides the Video Clip content to the display 40 on the line 402. If the display 40 is an interactive display and can receive touch inputs, the touch data is provided on a line 404 to the OS/Apps logic 51, which processes the touch inputs and responds accordingly. In this example, the Video Clip content is shown on the display 40 as the image 440.

In this configuration, the display 40 shows an example of how the viewer device 10 may display the results of viewing multiple images 442,444,446, from the displays 42,44,46 on the peer devices 12,14,16, respectively, as well as an image 440 from a local app running on the device 10. The resulting image on the display 40 is a compilation 448 of all the images being viewed from the four devices 10,12,14,16. In particular, the Video Clip from the local device is shown on the display 40 as the image 440, the Image Telestration content on the display 42 from the device 12 is shown on the display 40 as the image 442, the Web Image on the display 44 from the device 14 is shown on the display 40 as the image 444, and the Draft App content on the display 46 from the device 14 is shown on the display 40 as the image 446.

Also, each of the images on the display 40 is displayed in its own location on the display 40 as determined by the user or the Master App 60. The specific location (or coordinates x,y,z) of each of the content images 440-446 is determined by the user of the "viewer" device 10 or default locations set by the Master App settings. The user of the device 10 may also select the visual effects and location for each image to determine how each image is displayed in the compilation (or composite or total) image 448 (or VT) on the display 40. In particular, for the display 40 in this example, the Video Clip image 440 is displayed as rotated, the Image Telestration content 442 is shown on top of the web image 444, the Draft App image 446 is shown on top of the Web image 444 and the Video Clip image 440, and the Draft App 446 is also shown as partially transparent. Any other video or image effects and locations may be used if desired.

Figure 5:
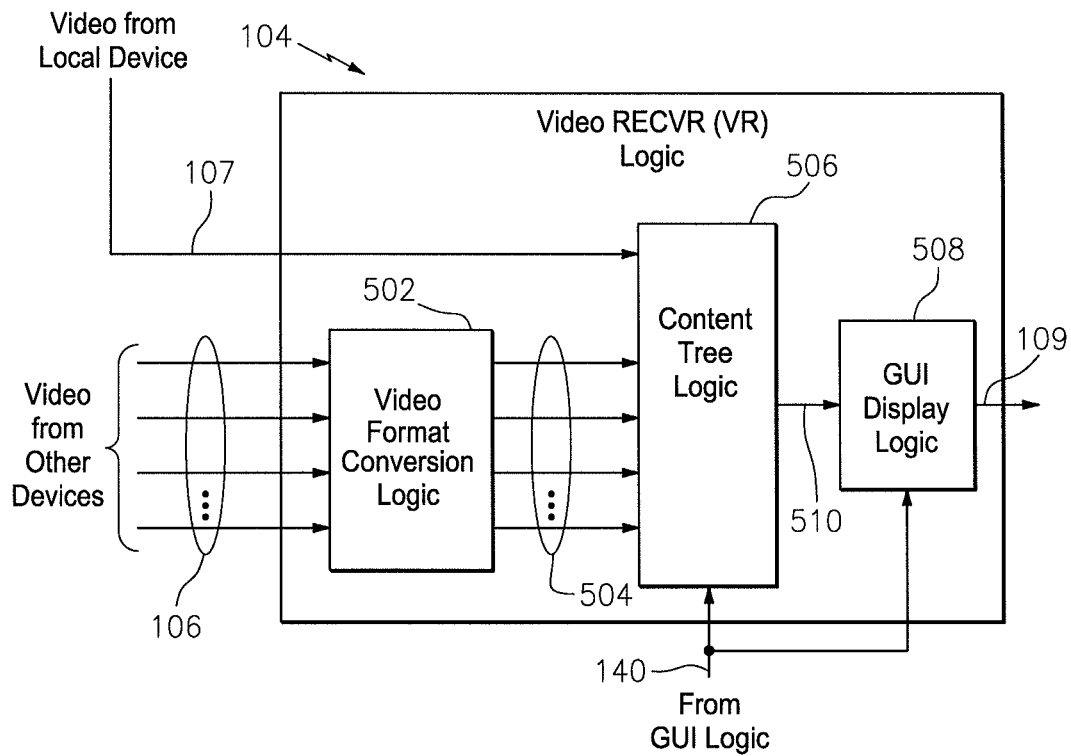
FIG. 5 is a block diagram of a video receiver logic component of the Master App software, in accordance with embodiments of the present disclosure.

Referring to FIG. 5, more specifically, the video receiver 104 receives remote and local video content and provides a compilation of the images 440-446 being viewed by the device 10 on the line 109 to the OS/Apps 51 for display on the local device screen 40. In particular, the video receiver comprises video format conversion logic 502, which receives the video input signals on the lines 106 from the peer devices that are being viewed by the local device. For each of video content input data 106, the format, sizing, and the like are converted (as needed) for use on the local computer operating system and software applications, and provides formatted video content data on the lines 504 to content tree logic 506. In addition, the video receiver logic 104 also receives video content from the local device on the line 107, which is fed to the content tree logic 506.

Figure 6:
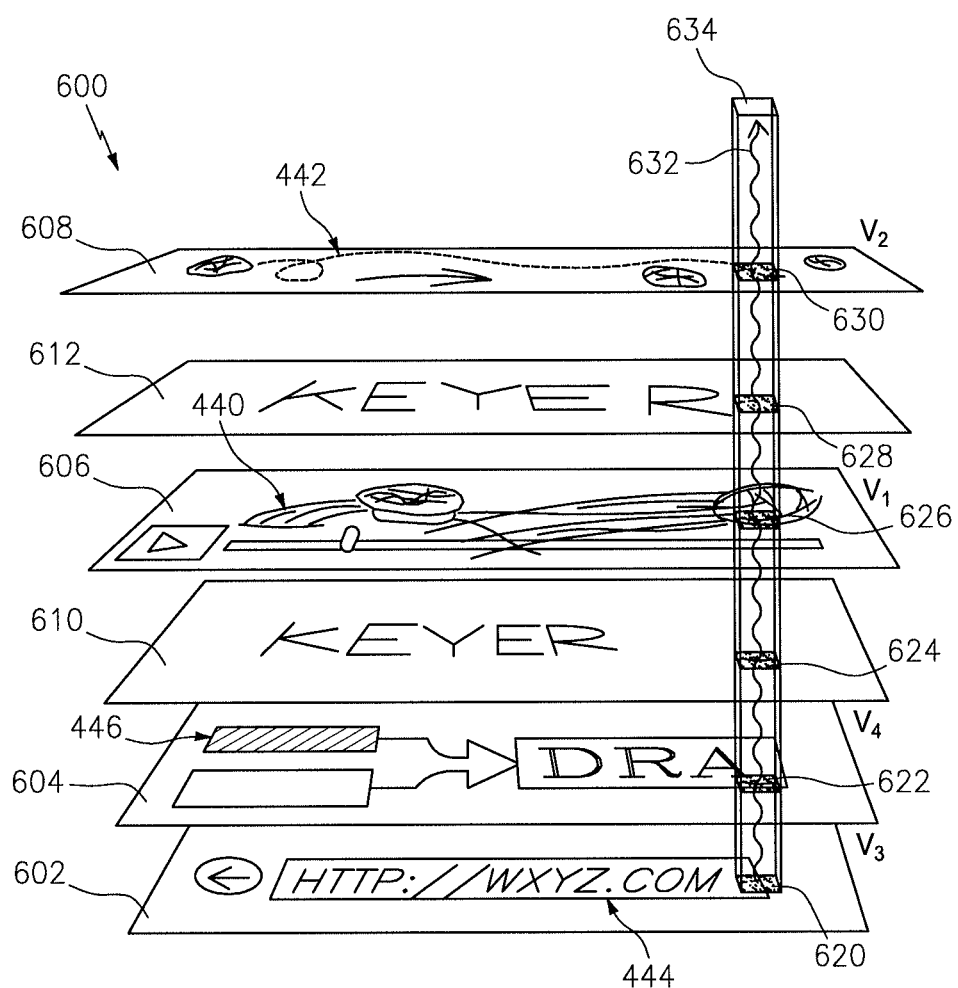
FIG. 6 is an illustration of a content tree having content layers and effects layers, and the creation of a compilation composition of pixels for display, in accordance with embodiments of the present disclosure.

Referring to FIGS. 5 and 6, the content tree logic 506 also receives data from the local device graphic user interface (GUI) logic 130 (FIG. 2) for both the Master App GUI and the Local App GUI(s), as needed to perform the functions of the Master App described herein, regarding visual effects for the various images 440-446 being displayed on the display 40. Referring to FIG. 6, each of the images 440-446 may be shown as content layers 602-608 of a multi-layer content tree 600. In addition, any visual effects that are added to an image (e.g., rotation, transparency, size, location, stacking order, and the like) may be shown as effect layers 610,612. For example, the effect layer 610 may be for the visual effect of making the Draft App image 446 partially transparent, and the effect layer 612 may be for the visual effect of rotating the video clip image 440 and placing the image 440 behind the other images 442,444,446.

The content tree logic compiles the image content and effects in all the content layers 600-612 and creates compilation pixels 620-630 from each of the visible layers 602-612 in the content tree 600, as indicated by a wavy line 632, yielding a final composite (or compilation) pixel 634 for each pixel in the display 40.

Referring again to FIG. 5, the content tree logic 506 within video receiver logic 104 provides compilation video content data on a line 510 to GUI display logic 508, which performs any final processing on the video content, as required by the Master App, to provide a final video content data on the line 109 to the local device operating system or local software applications for display on the local device display. In particular, the GUI display logic 508 also receives input data from the GUI logic 130 (FIG. 2), which indicates how the GUI should be displayed on the local display, e.g., on or off, and where located, based on the Master App and Local App settings provided by the settings logic 134 (FIG. 2) or other additional logic as needed to perform the functions described herein.

Figure 7:
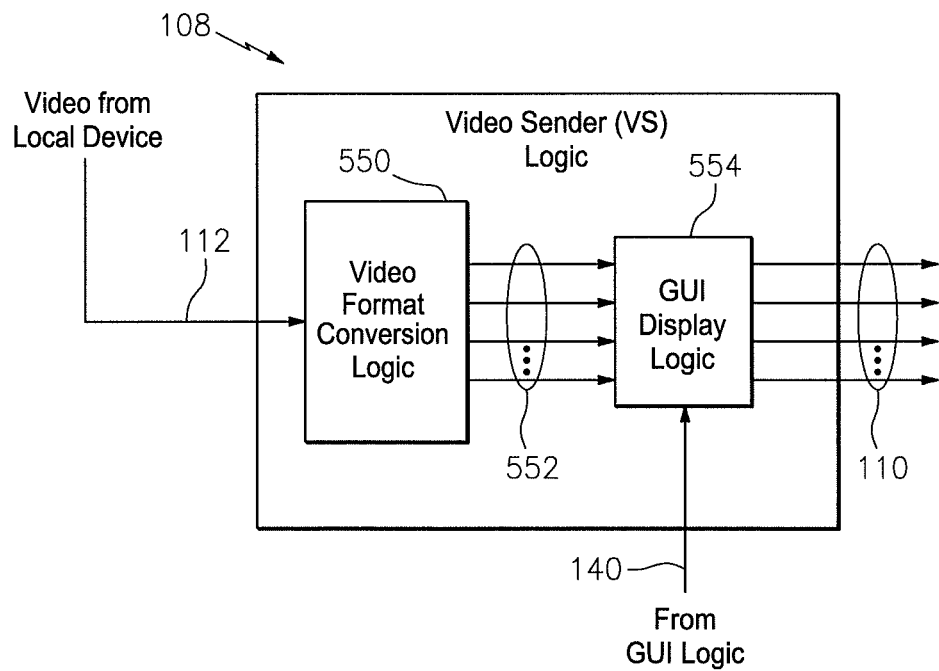
FIG. 7 is a block diagram of a video sender logic component of the Master App software, in accordance with embodiments of the present disclosure.

Referring to FIG. 7, as discussed hereinbefore, the video sender logic 108 of the Master App 60 may condition the video content data based on the device receiving the video and may add or remove the desired graphic user interfaces from the display (e.g., the Master App GUI or the Local App GUI) and performs any other formatting needed before sending the video content to the other peer devices that requested to view the content. More specifically, the video sender logic 108 receives local video content indicative of the image being displayed by the local device screen 40 (e.g., the image provided by a local app running on the device 10) on the line 112 to be sent to peer devices that have requested to view the content. For each video content output request, the format, sizing, and the like are converted (as needed) for use on the peer device, and formatted video content data is provided on the lines 552. Each peer device may have a separate formatted video content signal as shown by the lines 552. The video format conversion logic 550 provides the formatted video content data on the lines 552 to GUI display logic 558 (similar to GUI display logic 508 discussed hereinbefore with FIG. 5), which performs any final processing on the video content, as needed, to provide video content to each of the requesting peer devices on the lines 110. The GUI display logic 554 also receives input data from the GUI logic 130 (FIG. 2) on the line 140, which indicates how the GUI should be displayed on the local display, e.g., on/off or location, based on the Master App and Local App settings provided by the settings logic 134 (FIG. 2) or other additional logic as needed to perform the functions described herein.

Referring again to FIG. 4, when the user of the device 10 touches the display screen 40, the touch information is captured, encoded and bundled and sent to the source of the image similar to that discussed hereinbefore with the viewer devices of FIG. 3. In particular, if the user touches the image telestration app image 442, the touch data would be intercepted and provided to the touches sender (TS) logic 124 on the line 122 from the OS/App 51. The TS Logic 124 packages (or bundles) the touch input data and sends the touch data T2 to the device 12 on the lines 432 via the network 70 (FIG. 1), where it is received by the touch receiver (TR) logic 114 on the line 118 of the device 12. The TR logic 114 in the device 12 processes the touch data and formats and sends it on the line 120 to the local OS/Apps 53 for updating the video image on the line 412, which is also provided to the video sender (VS) logic 108 on the line 412. The VS logic 108 formats the updated image V2 and send the image V2 back to the device 10 on the lines 430 via the network 70 (FIG. 1). Similarly, when the user of the device 10 touches the display 40 where the Draft App image V4 is located, the Master App 60 receives the touch input and packages and sends the touch data T4 to the device 16 on the lines 432 via the network 70 (FIG. 1).

Accordingly, for software applications that allow touch (or equivalent) input interaction, the Master App 60 will receive and process the touch inputs and provide it to the source of the video image or content (i.e., content renderer) for processing and updating the display image by the associated application (as discussed herein with FIGS. 3 and 4). However, if a software application does not permit touch (or equivalent) interaction, the viewer device 10 may locally telestrate on the image (e.g., using a local telestration tool) and the telestration may stay with the local device display (discussed more hereinafter and with FIG. 8). In either case, the user of the viewer display may position the viewer windows where it desires and the order, rotation, size, transparency, and the like without such viewer window information being sent back to the source, if desired (discussed hereinafter).

Referring to FIG. 4, the device running the Master App 60 can operate as both a viewer and a renderer at the same time. For example, if the user of device 10 creates an image, or collection of images (such as the composite image 448 VT shown on the display 40), and wants to share the screen with the peer device 12, it can send its screen display (or a portion thereof) to the device 12, by sending a "send to" request via the communication link 138. In that case, a "send to" message request (or "request to send" message) would be sent to the desired target device 12, and the request message may appear (or pop-up) on the display 42 of the target device 12, which can be accepted or declined by the target device 12 (discussed more hereinafter with FIGS. 8, 13 and 14). If the device 12 accepts the "request to send", the video sender (VS) 108 in the Master App 60 of the device 10 would format the composite video image VT (shown on the display 40) as needed and send it on the line 434 to the VR logic 104 of the device 12. In that case, the device 10 would be acting as a content viewer (viewing images from the peer devices 12,14,16) and a content renderer (providing composite image to the device 12).

The VR logic 104 of the device 12 processes and formats the video as needed for its display and sends it to the OS/Apps 53 which displays the composite image VT on the screen 42 on the device 12, in place of the Image Telestration app image.

In that case, the renderer may send the composite video to the viewer device as an image of the renderer screen, or the renderer may send the viewer its content tree. When the content tree is sent, the viewer content tree becomes the same as the renderer content tree and thus the viewer would select the same inputs as the renderer had selected with the same visual effects.

Figure 16:
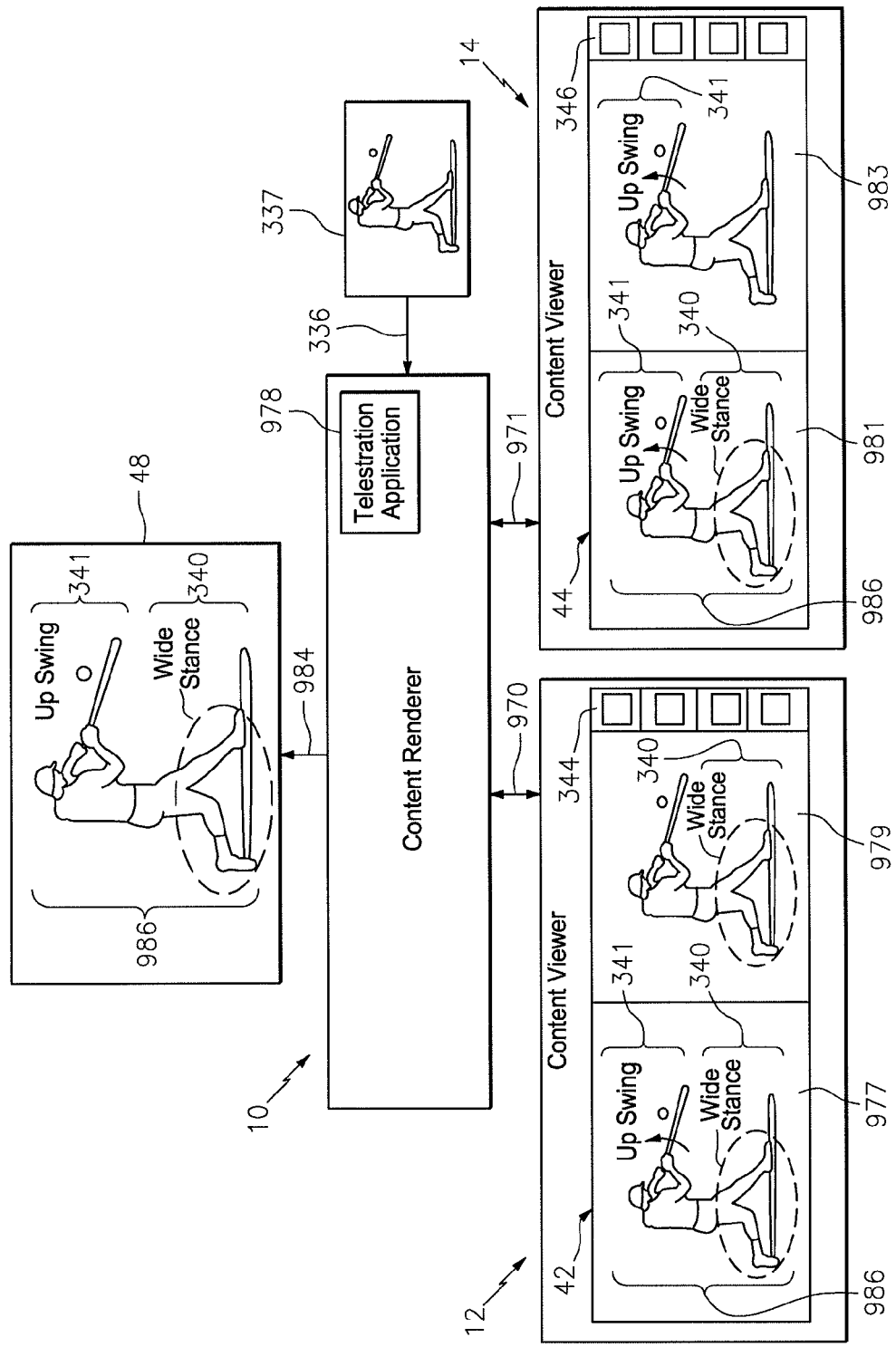
FIG. 16 is a block diagram of components of the system of FIG. 1, showing devices with split-screens, in accordance with embodiments of the present disclosure.

Alternatively, the device 12 may show the images from its local apps on one portion of the display screen 42 and show the composite image VT received from the device 10 on another portion of the display screen 42, e.g., in a split-screen configuration, such as that shown in FIG. 16. Also, in that case, if the user of device 12 touches the Draft App image 446 on the display 42 of device 12, the touch sender (TS) logic 124 of device 12 would send back touch data on a line 436 to the device 10, which would process it and provide it to the OS/Apps 51, and the TS logic 124 of device 10 would send it to the source of the Draft App image 46, i.e., the device 16.

The ability of the touch data to propagate (or flow) back through multiple devices to the original source is referred to herein as touch propagation. The number of levels of touch propagation allowed may be set by the users for each device Master App. (discussed hereinafter). If the touch propagation levels is set to one, the touch data will go back only one level to one device. In that case, the touch from device 12 on the Draft App would stop at the device 10 and touches to the Draft App would not reach the source device 16 and thus not be shown on the displays 40 or 42.

The software also has the ability to detect when its local image has been sent back to it, as in this example for the image V2 for the Image Telestration app image 442, and treats that image as if it originated at its own device and reflect local touches to the local image for this software application accordingly.

Figure 8:
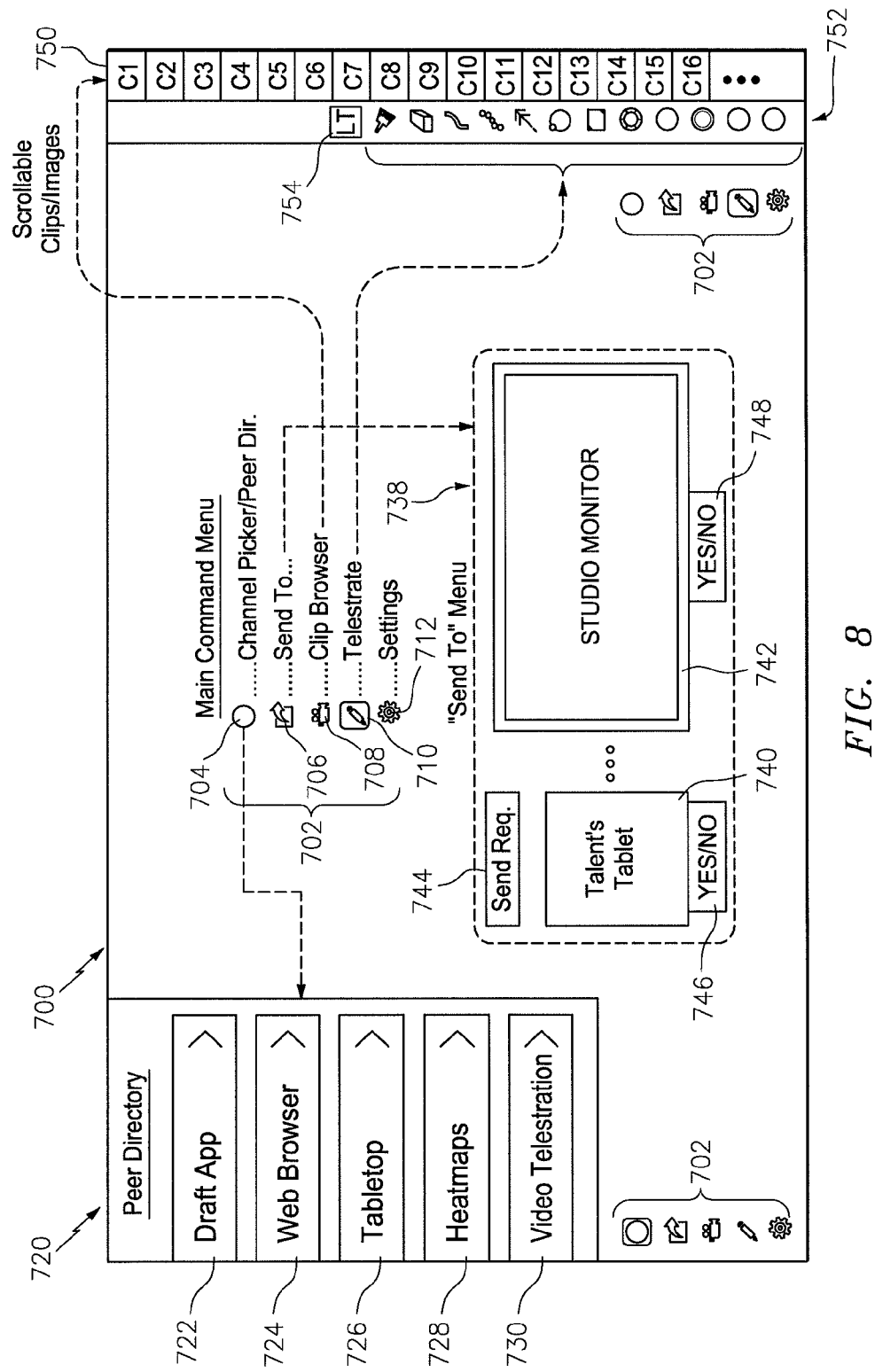
FIG. 8 is a screen illustration of a graphic user interface for the Master App software, in accordance with embodiments of the present disclosure.

Referring to FIG. 8, a graphic user interface (GUI) for the Master App software includes a main GUI command menu 702 which includes five options, the Channel Picker option 704, the Send To option 706, the Clip Browser option 708, the Telestrate option 710, and the Settings option 712). The main menu 702 options are shown as icons in the lower right and lower left portions of the screen 700, but can be displayed in any desired location(s).

In particular, when the "Channel Picker" menu option 704 is selected, the Master App displays peer device directory menu tabs 720, which shows a list of devices running the Master App (also referred to herein as "Master-loaded" devices or "peer" devices) or software applications running thereon, that may be "viewed" on the local device screen (i.e., "viewable" channels or inputs), which may appear as menu tabs displayed on the left side of the GUI display 700 (or in other locations). For example, the Draft App 722 (e.g., custom Sports Draft software application), the Web Browser App 724 (e.g., internet web browser to navigate to and display content from desired websites), the Tabletop 726 (e.g., a horizontal table-top display device used to view or annotate or telestrate videos/images on), the Heatmaps App 728 (e.g., custom application which shows images or graphics showing statistics such as frequency of events for sports players), and the Video Telestration App 730 (e.g., a custom application that allows illustration on top of a video image, discussed hereinbefore).

The peer devices displayed in the list may be displayed using labels to indicate what applications and video content are available for viewing, such as what device is running the application, the location or portion of the display of the application, the user or talent associated with the peer device application, the video format/size, content or link description, or other. For example, the Draft App tab 722 could alternatively be displayed as "Big Display" or "On-Air Display", indicating that this viewable content is coming from the large on-air display, or "Draft App, tablet, Coord. 0,0,0, Bob," indicating the name of the application, who the talent is using the device, the type of device, and the location of the video content on the screen (e.g., x,y,z coordinates of the upper left corner of the image).

Similarly, instead of "Web Browser", the label may display, "Web, Internet video, laptop, 10,10,0, 1080p, John", indicating that John's laptop is running a web browser viewing a Internet video with 1080p resolution, located at 10,10,0 on John's screen. The type/format of the label to be displayed for a given device or application may be set by the user of the device for the Master App running on that device, e.g., using the settings logic, discussed more hereinafter.

Also, the user may select more than one input, such as that described herein regarding FIG. 4. When multiple video content images are selected to be viewed by a device, the Master App allows the user to select how the images appear on the local screen, e.g., individually, in split screens or multiple windows, or simultaneously on the same screen or portion thereof. Also, one user device can be running multiple apps and thus list multiple apps may appear on the peer directory list from a single device, each of which would be displayed in the list and selectable for viewing by other peer devices.

Any number of viewable input channels or content input selections may be provided on the list 720, depending on the number of peer devices and the number of applications they are running. Also, any type of software application or inputs may be used in the peer directory channel picker list 720, such as NCAA tournament bracket application, SuperBowl application, video game applications, video editor application, external video input, any standard office applications, such as word processor applications, presentation applications, spreadsheet applications, and the like, other sports-related applications, or any other desired software application or content input capable of being run on one of the peer devices (including the content renderer).

The "Send to" (or "Send Content to") GUI menu option 706 (box with curved out-arrow icon), allows the user to send the contents of the local device display to one or more other Master-loaded peer devices via the network 70 (FIG. 1). In particular, when the "Send To" option is selected, a "Send To" menu screen 738 appears on the screen 700 having selectable boxes 740,742 (indicative of peer devices), one box for each Master-loaded device display on the network 70, as well as a "Send Request" button 744 that, when selected, sends the "Request to Send" message. The user may select one or more boxes by clicking (or touching) the desired boxes to send the local display image and then, when the user selects on the Send Request button 744, the Master App sends the "Request to Send" message to the selected target devices and, if accepted, Yes/No display boxes 746,748 under the boxes 740,742, respectively, will indicate "Yes", and the target device begins "viewing" the local device screen. In that case, the image on the local display is "rendered" to the selected target devices that accept the request, i.e., the local device becomes a content "renderer." If a selected target device declines the request, the corresponding boxes 740,742 will display "No", indicating that device will not be displaying the content.

For example, in this case, the selectable box 742 corresponds to the Studio Monitor peer device and the selectable box 740 corresponds to the Talent's Tablet peer device (e.g., Bob's Tablet). If the user of the device, e.g., on-air talent (or other user), selects the "Studio Monitor" option and selects Send Request, and the request is accepted by the Studio Monitor device, the "Studio Monitor" begins "viewing" the local display, the Yes/No display will show "Yes", and the local display device becomes a content "renderer."

The "Clip Browser" menu option 708 (movie camera icon), when selected, enables the user to scroll through available video clips or images to select the desired clip/image to watch or annotate. When the Clip Browser app option 708 is selected, a new GUI menu 750 may appear having a series of video clips or images (like a cameral roll) which the user can scroll through and select for viewing.

The "Telestrate" menu option 710 (pen/pencil icon), when selected, allows the user to annotate the image on the screen using various annotation tools. When the Telestrate option 710 is selected, a new GUI 752 may appear providing a plurality of illustration or annotation tool icons, such as (from top-down) a broom (to sweep away portions of the image), eraser, solid line, dotted/dashed line, arrow, circular shape, rectangular shape, animated blinking circle, and four colors (red, orange, blue, green). Other annotation commands and colors may be provided if desired. When the Telestration option 710 is selected, the user may locally telestrate over one or more images or windows on the users desktop. In that case, such telestrations may stay local and be viewed only by the local screen or the compilation may be sent to a peer as discussed herein with FIG. 4. However, if an application being viewed allows for touch (or equivalent) interaction (e.g., video telestration app, Draft app, and the like), then those touches associated with that application image are sent back to the source (content renderer) of that application/image, for processing and updating the image in response to the touches, as discussed herein with FIGS. 3 and 4. In some embodiments, there may also be a Local Telestration (LT) button 754, that, when selected, allows the user to telestrate on an image of a viewed touch-interactive app, but the telestration stays on the local device until the user releases it to the renderer for processing and updating the image for viewing and display by the peers, e.g., by un-selecting (or de-selecting) the LT button 754. This allows the user to try various telestrations on a viewed image and, when the telestration content is acceptable to the local user, allows other peers to view it.

The "Settings" menu option 712 (gear icon), when selected, allows the user to select various attributes associated with the Master App software, to perform the functions described herein, such as various display options, defaults, and the like. Referring to FIG. 9, in particular, when the Settings option 712 is selected, a new pop-up GUI menu 750 may appear having a series of options to select. More specifically, a checkbox 762 is provided for tailoring the Master App GUI menus that, when selected, provides a checkbox 763 to turn off (not display) the Master App GUI on the local device/display, which may be used for when the local device is connected to the on-screen (or on-air or big) display to control whether the audience sees the Master App GUI menu. It also provides a checkbox 764 for selecting the location of the Master App GUI main menu 702 (FIG. 8), which, when selected, provides a series of checkboxes 765 providing location options for the GUI, e.g., Left Side, Right Side, Top, Bottom.

Also, a checkbox 766 is provided for tailoring the Master App GUI menus that, when selected, provides a checkbox 768 to turn off (not display) the Local App GUIs on the local device/display, which may be used for the on-screen (or on-air or big) display to control whether the audience sees the Local App GUI menu. In addition, a checkbox 770 is provided for indicating whether the local device is connected to or driving the on-screen display. If this button 770 is selected, it may provide an indication in the label on the peer directory that this is an on-screen display device. This attribute may be used to warn other peer devices that content sent to this device will be displayed on-screen, or to prevent certain devices from sending content to an on-screen display device, or for other purposes.

A checkbox 772 is also provided for selecting window display options as a "viewer" that, when selected, provides a series of checkboxes 774 providing size and position options for the viewer images when they are selected by the user, e.g., Icon on Bottom (small thumbnail images on bottom of screen for each new window), Window Tiles (windows are fit on the screen side-by-side, left-to-right then top-to-bottom of the screen), Overlapping Windows (windows are placed over each other, displaced slightly with newest on top), Split Screen/Multi-Screen (each new window splits the screen). Also, there may be an option, e.g., "Local Input Split Screen", that allows for a split screen option which shows the composite viewed video image (showing all peer inputs) on one side of the split screen and displays only the local telestration (or modifications) on the clean (or input) video image on the other side of the split screen, as shown in FIG. 16.

A checkbox 776 is also provided for selecting window display options for displaying Local Apps that, when selected, provides a series of checkboxes 778 providing size and position options for the viewer images when they are selected by the user, e.g., Icon on Bottom (small thumbnail images on bottom of screen for each new window), Window Tiles (windows are fit on the screen side-by-side, left-to-right then top-to-bottom of the screen), Overlapping Windows (windows are placed over each other, displaced slightly), Split Screen/Multi-Screen (each new window splits the screen; also referred to as "Multi-Window"), Same Screen as Viewer (images viewed from remote peer devices are placed on the same screen as local apps), Split Screen from Viewer (images viewed from remote peer devices are placed on a different split screen from the local apps). The user may select multiple options if desired.

A checkbox 780 is also provided for selecting attributes for when the device is acting as a content "renderer" that, when selected, provides a series of checkboxes 782 for how an image is sent to a peer device, e.g., Entire Screen (the entire viewing screen of a local running app is sent), Selected Portion of Screen (a portion of the screen is sent as determined by the user of the content renderer or the viewer), Without GUIs (the image is sent without any GUIs menus displayed), and Prompt for Selection each time (the system prompts the user of the device regarding how it will send the image/screen).

A checkbox 784 is provided for selecting attributes for when the "send to" feature of the Master App that, when selected, provides a series of checkboxes 786 for how an image is sent to a peer device when the local device is prompting the transmission, e.g., Entire Screen (the entire viewing screen of the local device), Selected Portion of Screen (a portion of the screen is sent as selected by the user of the device or the viewer), Without GUIs (the image is sent without any GUIs menus displayed), and Prompt for Selection each time (the system prompts the user of the device regarding how it will send the image/screen). Also, there may be options, e.g., "Send Screen Image" and "Send Content Tree", to send the image of the screen or to send the content tree, to the other peer device, when a send request has been accepted, as discussed herein.

A checkbox 788 is provided for selecting degrees or levels of touch propagation when a device receives an image from a peer device that was being viewed from another peer device, such as that described herein with FIG. 4. When the checkbox 788 is selected, it provides a series of checkboxes 790 for how many levels of touch propagation to permit.

A checkbox 792 is also provided for selecting attributes associated with the display of the Peer Device Directory 720 (FIG. 8) that, when selected, provides checkboxes 793,795, for selecting the location of the list and the label shown in the list. In particular, when the button 793 is selected, a series of checkboxes 794 is provided for location options for the directory list, e.g., Left Side, Right Side, Top, Bottom. When the button 795 is selected, a series of checkboxes 796 is provided showing options for the label(s) in the directory list associated with that device, e.g., App Name, Image Screen Location, User/Talent Name, Device Type, Image Content Summary, such as that discussed hereinbefore with FIG. 8.

For the Settings options described herein, the user may select more than one option in a given section if desired. Also, other options may be provided to the user if desired.

Figure 10:
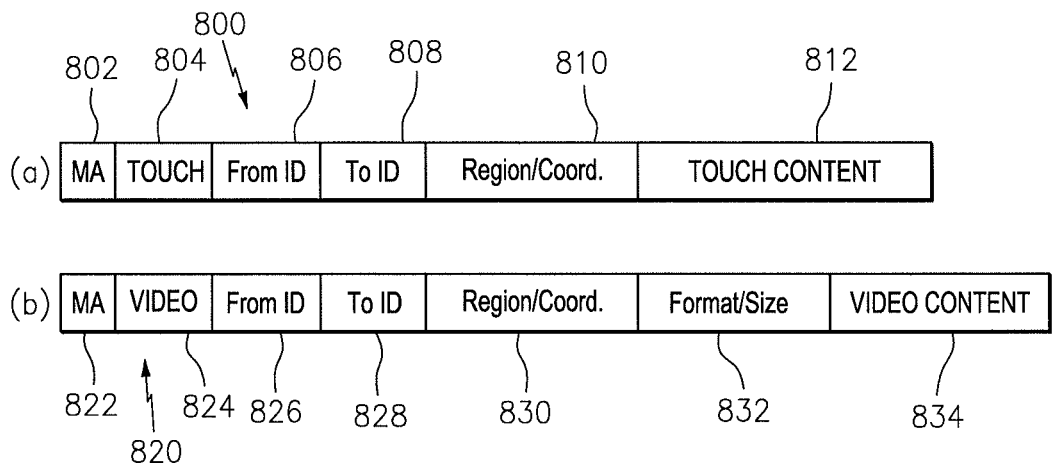
FIG. 10, illustrations (a) and (b) are diagrams of a digital data format for touch and video content, respectively, in accordance with embodiments of the present disclosure.
Figure 11:
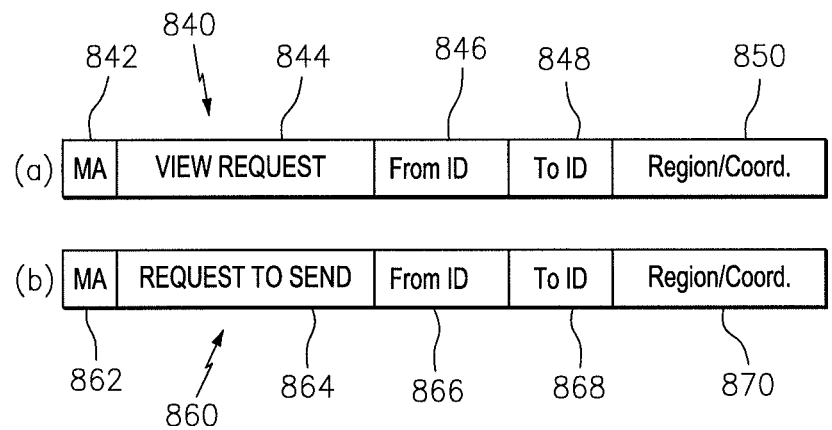
FIG. 11, illustrations (a) and (b) are diagrams of a digital data format for "view request" and "request to send" messages, respectively, in accordance with embodiments of the present disclosure.
Figure 12:
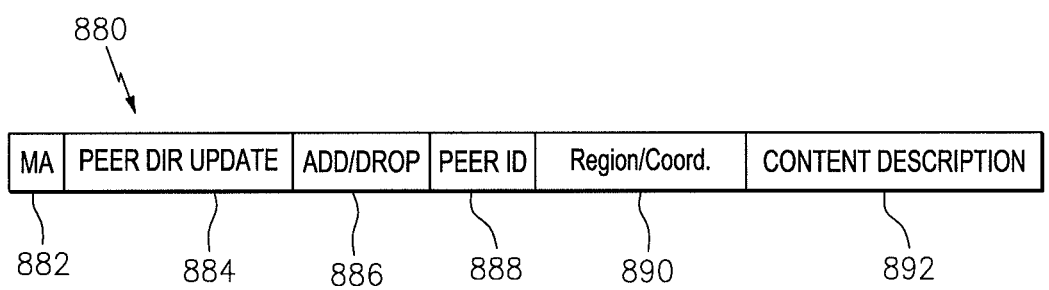
FIG. 12 is a diagram of a digital data format for a "peer directory update" message, in accordance with embodiments of the present disclosure.

Referring to FIGS. 10-12, when a peer device provides video or touch (or user) input content (or data) to another peer device over the Network 70 (FIG. 1), or other messages are sent and received between peer devices, the Communications I/O logic 136 (FIG. 2) provides streaming serial data having a predetermined format or structure that, for video and touch data, may be done in conjunction with the video receiver 104, the video sender 108, the touch receiver 114, and the touch sender 124. In particular, referring to FIG. 10, illustration (a), touch (or user input) data or content may be sent with a word or data structure or format 800, having data portions or fields or segments. More specifically, a segment 802 may indicate that the message is a Master App message (MA), segment 804 may indicate what type of content is contained in the message (Touch or Video), and may also indicate the type or nature of touch (or user input) data. It is to be understood that in this disclosure, references to user input or touch input/data may include other types of user input data input through other mechanisms such as a mouse click, touch pad press, screen touch, keyboard press, light pen, jog wheel, remote control, or the like. For example, a USB-connected shortcut box may be connected to the content renderer to affect the content renderer in situations where input simplification is desirable (such as when an on-air talent user is averse to using a touch screen for advanced features). A segment 806 may be the device ID of the device sending the touch content, segment 808 may be the device ID of the intended recipient of the touch content, segment 810 may be the location or region or screen coordinates of the touch data, and segment 812 may be the touch/input content or value, e.g., character/key typed, to be acted upon by the receiving (content viewer) peer device. The content and format of the data fields 810, 812 for the touch (or user) inputs will depend on the type or level of touch (or input) data that is sent to the other devices, e.g., state data, common input language data, command/event data, or other format data, as discussed herein. The device ID, as discussed herein, is data indicative of the make/model of the device's computer operating system used, screen type/format, and any other device characterizing information needed to facilitate the transfer or receipt of content/data between peer devices. Other formats may be used if desired.

Referring to FIG. 10, illustration (b), video data or content or image may be sent with a word or data structure or format 820, having similar data portions or segments to the touch structure 800. More specifically, a segment 822 may indicate that the message is a Master App message (MA), segment 824 may indicate what type of content is contained in the message (Touch or Video), segment 826 may be the device ID of the device sending the video content, segment 828 may be the device ID of the intended recipient of the video content, segment 830 may be the region or screen coordinates of the video data, segment 832 may indicate the format or size of the video image being sent, and segment 834 may be the video content to be acted upon and displayed by the receiving (content viewer) peer device.

As discussed herein, the video data or touch (or user) input data may typically be streaming serial data sent to and received from the intended device. Also, a video image, as described herein, means an image that is part of a stream of images (or frames) having an update rate or frame rate that make up a video stream. The invention will also work with an individual still image, if desired. Also, instead of or in addition to using the Communications I/O logic 136 (FIG. 2), the video and touch (or user) data may be sent/received directly from/by the video receiver 104, the video sender 108, the touch receiver 114, and the touch sender 124, as appropriate, having the format discussed herein.

Referring to FIG. 11, illustrations (a) and (b), when a peer device desires to view or desires to send content (or data) to another peer device over the Network 70 (FIG. 1), the Communications I/O logic 136 sends a communication message to the other device having a predetermined format or structure. In particular, referring to FIG. 11, illustration (a), a view request message may have a word or data structure or format 840, having data portions or fields or segments. More specifically, a segment 842 may indicate that the message is a Master App message (MA), segment 844 may indicate the type of message (i.e., View Request), segment 846 may be the device ID of the device sending the message, segment 848 may be the device ID of the intended recipient of the message, and segment 850 may be the region or screen coordinates of the video/image desired to be viewed. The "View Request" message may be sent when a user selects the Channel Picker in the Master App main menu 702 (FIG. 8) and selects the desired devices it wants to view (i.e., a content viewer) from the Peer Directory list 720, as discussed further herein.

Referring to FIG. 11, illustration (b), a "Request to Send" message may have a word or data structure or format 860, having data portions or fields or segments. More specifically, a segment 862 may indicate that the message is a Master App message (MA), segment 864 may indicate the type of message (i.e., Request to Send), segment 866 may be the device ID of the device sending the message, segment 868 may be the device ID of the intended recipient of the message, and segment 870 may be the region or screen coordinates of the video/image desired to be sent. The "Request to Send" message may be sent when a user selects the "Send To" command in the Master App main menu 702 (FIG. 8) and selects the desired devices it wants to send its local display content to (i.e., or the desired devices it wants to have "view" its local display content), as discussed further herein. Other types and formats of the messages 840,860 may be used if desired, and this format may be used for other messages sent between devices.

Referring to FIG. 12, when a device joins the network 70 as a peer device or an existing peer device launches a new software application, it is identified by peer discovery logic running on the peer server 98 on the network 70 which sends a "Peer Directory Update" message 880 to all the peer devices on the network (70). The peer logic identifies the peer device and obtains the necessary information for communicating with the device, including information for the device label for the peer directory, which may be obtained from the Master App device settings 795 (FIG. 9). In particular, the message 880 may include a segment 882 indicating that the message is a Master App message (MA), a segment 884 indicating whether to add or drop the device from the list, a peer ID segment 888 indicating the device ID of the peer, a Region/Coordinate segment 890 indicating the location of the content from the peer device, and a content description segment 892 indicative of any other descriptive content of the peer device or the content being viewed thereby, such as App Name, User/Talent Name, Image content summary (as described herein with FIG. 9), or any other attributes that describe the device or what the device is viewing or what software application it is running and it capable of being viewed by other peer devices.

Instead of (or in addition to) sending the Peer Directory Update message 880 to all peer devices, the peer directory server 98 or the discovery software associated therewith (discussed herein), may maintain a list of currently active peer devices on the network 70 and the Master App running on each of the peer devices may poll (or sample) the Peer Directory Server 98 at a predetermined sample rate and update its local Peer Directory list accordingly.

Figure 13:
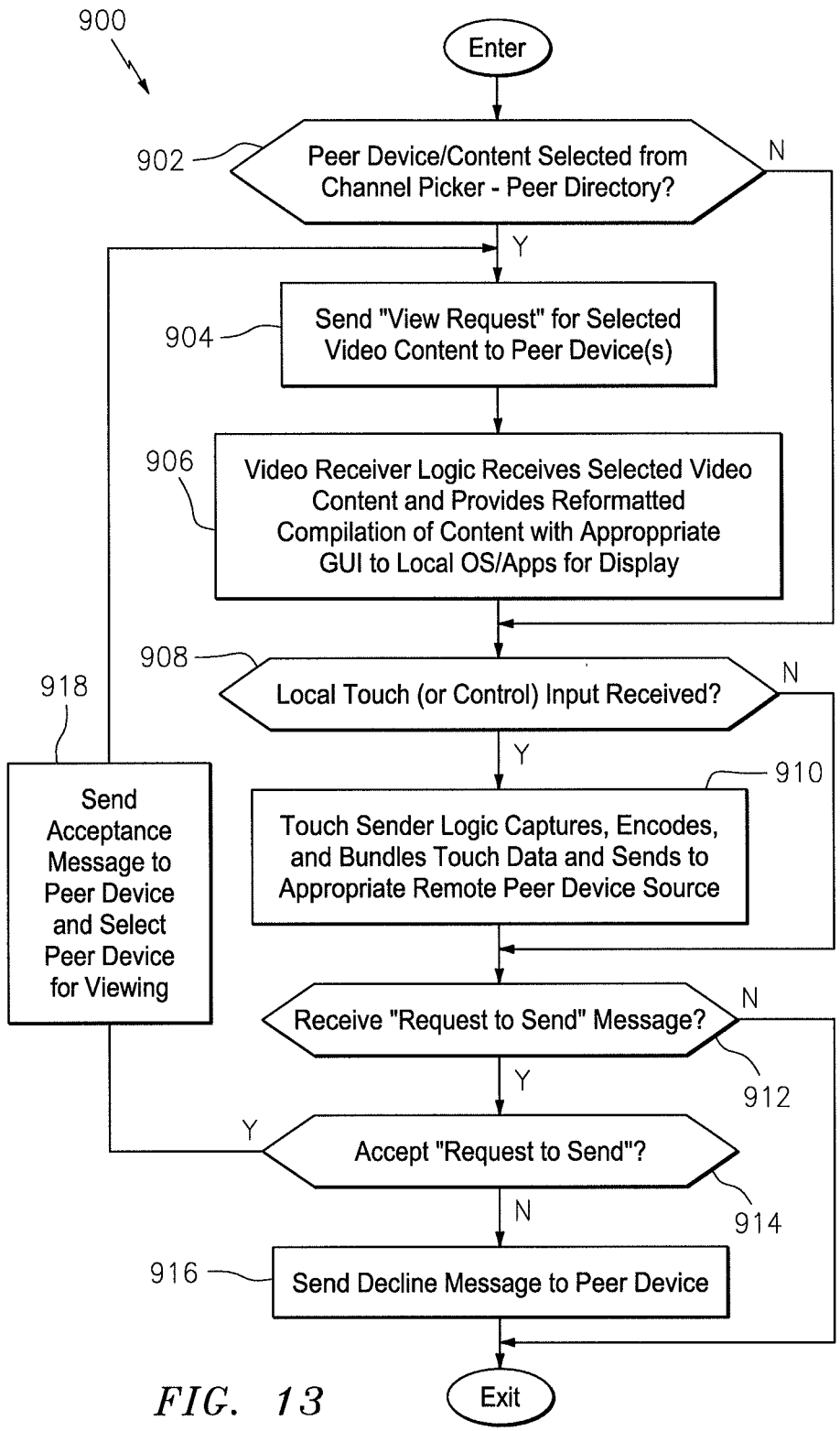
FIG. 13 is a flow chart of a content "viewer" process, in accordance with embodiments of the present disclosure.

Referring to FIG. 13, a flow chart 900 for when the Master App is acting as a content "viewer," such as that discussed herein with FIGS. 3 and 4, begins at a block 902, which determines if a peer device (or peer device content) from the Peer Directory 720 (FIG. 8) has been selected by the local user. If YES, block 904 sends a "view request" message for the selected content to the selected peer device. Next, at block 906, the video receiver logic 104 (FIGS. 2-5) receives the selected video content and provides a reformatted video content compilation that has the appropriate GUI display, as discussed herein, to the local Operating System and Software applications (51-57)(FIGS. 1,3,4), which includes performing the Video Format Conversion logic 502, the Content Tree logic 506 and the GUI display logic 508, discussed herein with FIG. 5.

After block 906, or if the result of block 902 is NO, block 908 determines if a local touch (or control or user) input has been received by the local device. If YES, at block 910, the touch sender logic 124 captures (or intercepts), encodes (or converts) and bundles (or packages) the local touch data and sends it to the appropriate remote peer device which is the source of the video content touched, as also discussed herein. Accordingly, the box 910 captures (or intercepts) and sends local touch (or user input) data associated with software applications having video content that is being "viewed" by the local device from a peer device content renderer. Touch (or user) inputs not associated with such viewed content are processed and displayed locally by the local operating system and associated local software application running on the local device. In addition, when the Local Telestration (LT) option 754 (FIG. 8) is selected, touch (or user) inputs may remain locally processed and displayed and not intercepted and sent to the renderer peer device until the user decides to send it.

After block 910, or if the result of block 908 is NO, block 912 determines if a "Request to Send" message has been received for the selected video content from a peer device on the network 60 and verifies the peer device source of the message. If no message received, the process exits. If a "Request to Send" message has been received, block 914 determines whether the user has accepted the request. If YES, block 918 sends an acceptance message to the requesting peer device and selects that peer device content for viewing. The process then goes to block 904 to send a "view request" message to the selected peer device. As discussed hereinbefore, if the send attribute is selected to send the content tree, then the content tree of the sending device is provided to the viewer and all the inputs selected by the renderer are selected by the viewer along with the visual effects in the content tree. If the result of bock 914 is NO, block 916 sends a decline message to the requesting peer device and the process exits.

Figure 14:
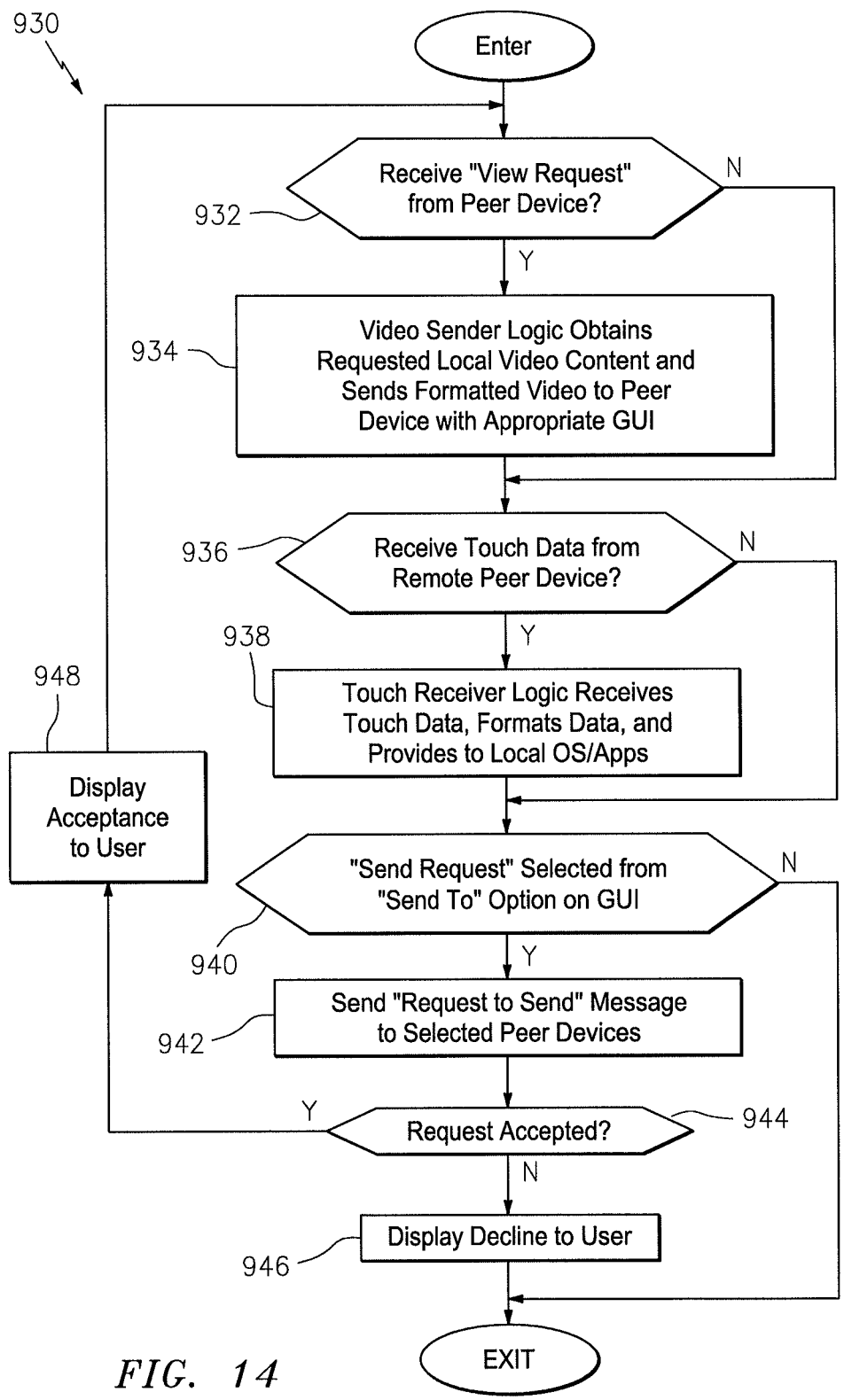
FIG. 14 is a flow chart of a content "renderer" process, in accordance with embodiments of the present disclosure.

Referring to FIG. 14, a flow chart 930 for when the Master App is acting as a content "renderer," such as that discussed herein with FIGS. 3 and 4, begins at a block 932, which determines if the Master App has received a "view request" from a remote peer device. If YES, at block 934, the video sender logic 108 obtains the requested local video content and sends the requested content to the selected peer device having the appropriate formatting as needed by the receiving (or viewing) peer device, as discussed herein. After block 934, or if the result of block 932 is NO, block 936 determines if touch data has been received from a remote peer device. If YES, the touch receiver logic 114 (FIGS. 2,3,4) receives the remote device touch data and formats the touch events as needed and provides the touch data to the local OS/Apps (51-57) (FIGS. 1,3,4), as described herein, for use by the local operating system or software applications.

After block 938, or if the result of block 936 is NO, block 940 determines if the "Send Request" button in the "Send To" option 706 (FIG. 8) has been selected. If YES, block 942 sends a "Request to Send" message to the peer devices selected, as discussed herein. Next, block 944 determines if the request has been accepted by one or more of the recipients of the "Request to Send" message. If YES for any of them, block 948 displays the acceptance ("YES" in corresponding display sections 746,748 in FIG. 8) to the user for the associated device(s) and the process goes to block 932 to wait for the "View Request" from the peer device(s) that accepted the request. If NO for any of them, block 946 displays the decline ("NO" in corresponding display sections 746,748 in FIG. 8) to the user for the associated device(s) and the process exits.

Figure 15:
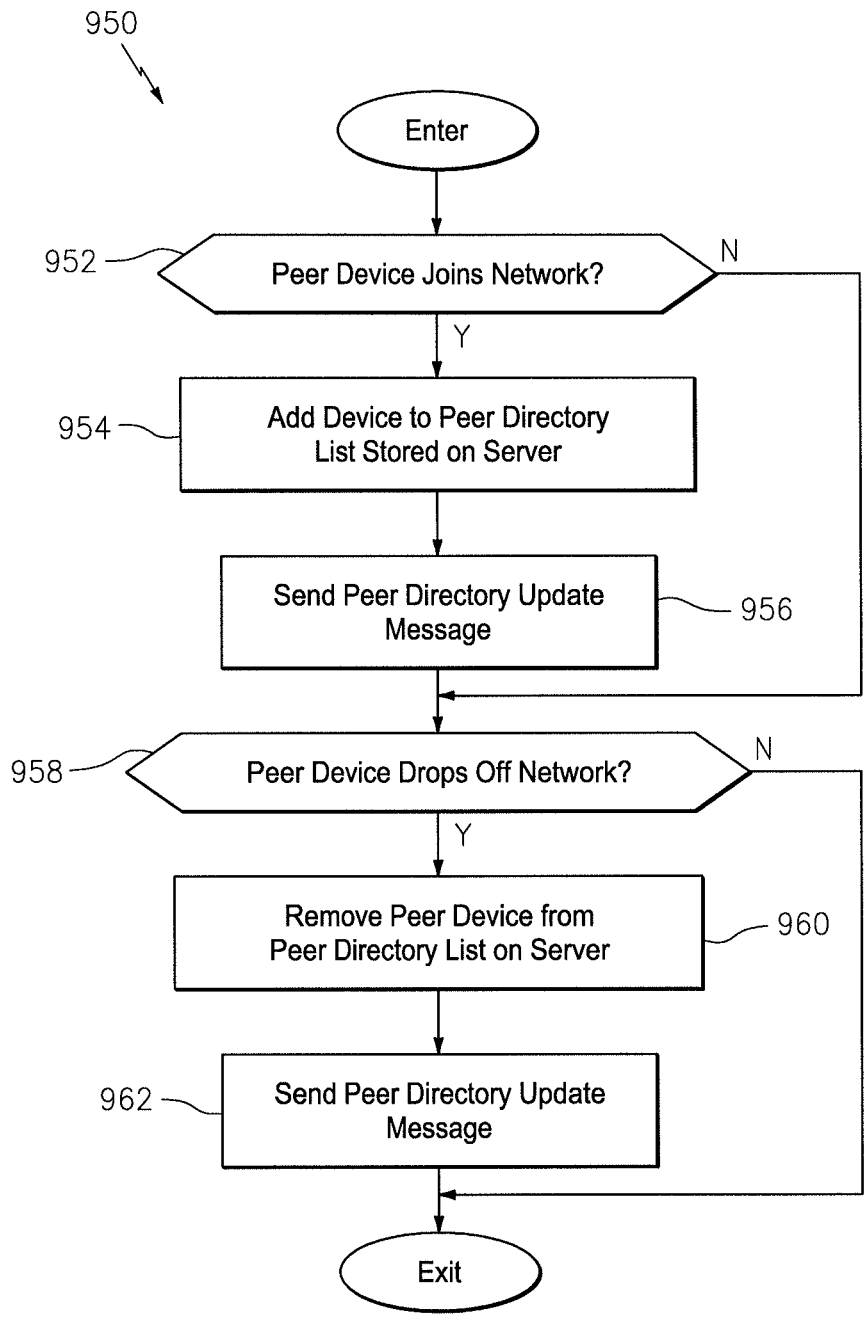
FIG. 15 is a flow chart of a process for updating the peer directory when devices join and leave a network, in accordance with embodiments of the present disclosure.

Referring to FIG. 15, a flow chart 950 illustrates logic for updating the peer device directory list 720 (FIG. 8) for use by the Master App, such as that discussed herein with FIG. 8, begins at block 952, which determines if a Master-loaded device (or peer device) has joined the network 70. If YES, block 954, adds the device to the Peer Directory list 720 (FIG. 8), which may be stored on the Peer Directory server, or elsewhere, as discussed herein. Next, a block 956 sends a peer directory update message 880 (FIG. 12) to peers devices on the network informing them of the peer list update. After block 756, or if the result of block 952 is NO, block 958 determines if a Master-loaded device has dropped off the network 70. If YES, block 960 removes the device from the Peer Directory list 720 (FIG. 8). Next a block 962 sends the peer directory update message 880 (FIG. 12) to peers devices on the network informing them of the peer directory list update. Instead of sending the peer directory update message 880 (FIG. 12) when peer devices join or leave (or drop-off) the network 70 (FIG. 1), as discussed herein, the Master App on each device may sample or poll the Peer Directory list and update the local display with the latest peer information if desired.

Referring to FIG. 16, an alternative embodiment is shown, with the Master-loaded peer devices 12,14 having the displays 42,44, respectively, each operating as a content viewer, and the Master-loaded peer device 10 operating as a content renderer, similar to that shown in and described with regard to FIG. 3. In that case, the content renderer 10 receives the input of clean image 337 (FIG. 3) on the line 336 and is running the Video Telestration App 978 (discussed herein). The content renderer 10 also communicates with the viewer devices 12,14 on the lines 970,971 via the network 70 (FIG. 1), and provides a composite image (video content) 986 to the display screen 48 on line 984, the composite image 986 rendered from all the peer device telestrations, which includes the clean image 337, and the telestrations 340,341, similar to that described herein with FIG. 3.

The displays 42,44 each have the ability to show split screens, 977,979 and 981,983, respectively, where each of the viewer devices 12,14 has the option to show the composite image 986 on one side of the split screen 977,981, respectively, acting as the "viewer", and to also show the local users annotation (or telestration or modification) on the other side of the split screen 979,983, respectively. In that case, the Local Telestration LT option 754, discussed hereinbefore with FIG. 8, may be used to telestrate and view an image or video content locally by the user of the local device prior to (or, alternatively, contemporaneously with) sharing it with other peer devices on the network. Also, local GUIs 344,346 for the Video Telestration app (as described herein) may be displayed on one side of the split screens 979,983, or may be displayed on the other side of the split screens 977,979 (not shown), or may be displayed on both sides of the split screens of the displays 42,44, if desired.

This feature gives each device user the option to display the composite image created from all user inputs on one portion of the display screen and to display the local user's annotation on another portion of the screen, e.g., using the split screen or multi-window features of the present invention discussed herein. This may be useful for on-air/studio or collaborative settings where each user may want to view their own annotations or inputs separately from the overall composite image created by all user inputs.

In some embodiments, the on-set (or on-air) display 48 (FIG. 3) could be a plain monitor (without touch capability), a virtual monitor, a switcher, direct-to-broadcast functionality, or the like. Additionally, the user devices 10-16 may any type of computer-based devices capable of performing the functions described herein, and could be all the same type of device (e.g., an iPad® or other touch screen tablet computers) or various different types of devices such as tablets, desktop computers, laptop computers, smart phones, or any other like devices capable of sending or receiving user inputs (such as touch inputs, mouse clicks, keyboard strokes, light pen inputs, and the like) and images (such as graphics, videos, still images, and the like).

Also, the user devices 10-16 need not have touch capability, but may have other annotation or command control input capability or support software applications doing same, or the ability to provide a desired image, video or other content. For example, at least one of the user devices 10-16 may have drawing or telestration software or the ability to obtain, retrieve or download a video, film-clip, database file, or a website, which can be provided to the content renderer device for local display and for broadcast to the viewer devices.

As discussed herein, the devices may all connect (wired or wireless) to the common communications network 70 (FIG. 1), e.g., local area network (LAN), a wide area network (WAN), a virtual private network (VPN), the internet, or any other communication network, and communicate to each other via the network. In some embodiments, the devices may be connected peer-to-peer, or in other embodiments, the viewer devices and the On-Air Display may all connect directly to the content renderer device. Any other direct or network connection configuration that provides the functions described herein may be used if desired.

In some embodiments, the Master App software on a device joining or connecting to the network (or connecting directly to another device in a peer-to-peer arrangement) may perform a "handshake" type interaction or negotiation/handshake or validation process with the Peer Directory server or Discovery software (as discussed herein), or with the other peer device(s), including sending information about the type of user device joining/connecting (including information such as screen resolution, aspect ratio, etc.). This allows the Master App software on the content renderer device (or other device) to modify the video content data (as necessary) using known techniques, to the proper format to display correctly on the connecting device, as discussed herein. During the interaction/negotiation/validation of the initial connection, a device ID may be used or created so the peer devices can identify the new device in future interactions. Device ID types may include MAC address, IP address, assigned index, user ID, machine name, or any other device identification technique or approach that allows each user device to be uniquely identified, such as that described with FIGS. 10-11.

As discussed herein, the touch receiver 114 in the Master App software 60 translates the coordinates of the touch data (or raw touch data) received from the remote viewer devices to the local devices frame of reference (or reference screen map), based on information about the sending viewer device such as screen resolution and aspect ratio. Fixed information about a device, such as screen resolution and aspect ratio, may be sent by each peer device when it joins or connects to the network 70 (FIG. 1), e.g., during a handshake communication or negotiation or validation process. Variable information, such as the coordinates of the touch, the type of touch, etc. may be communicated directly between the peer devices as part of a communication format and protocol, such as that discussed with FIGS. 10-11.

Once the touch coordinates are translated, the touch receiver logic 114 processes the translated touch data with information about the GUI for the software application running on the local device (e.g., the Video Telestration app, FIG. 3) to convert the translated remote touch data into an event or command (e.g., button A pressed) and sends (or "throws") this action to the local software application or operating system on the line 120, which contains the GUI logic and translates the event into an action (e.g., paintbrush feature selected). The local software application then performs the action as if it had come from its own local touch screen. Multiple touches are processes by the local system as they are received (either from the local system or one or more remote peer devices).

As shown and discussed with FIG. 3, the content renderer 10 sends a video output stream from the local software application (e.g., Video Telestration app) running on the content renderer 10 to the video sender logic 108 of its Master App software 60 on the line 112. The video sender logic 108 formats (as needed) the video according to the formats specified by each requesting device, and provides the output video signal in the requested format to each requesting device on the lines 110. In addition, the local software application (e.g., the Video Telestration app) running on the content renderer 10 may generate a graphical user interface (GUI) 344,346 (FIG. 3), which is a collection of graphics that serve as control elements to receive inputs from a user. The GUI elements 344,346 are provided to the video sender logic 108 content renderer's Master App software, which sends it to each requesting viewer devices 12,14. As shown in FIG. 3, each viewer device 12,14 receives a custom image and GUI display depending on the screen size, resolution, aspect ratio, etc. of the viewer device.

In the examples shown in FIG. 3, the GUI elements 344,346 for the viewer devices 12,14 may be simply the graphical elements themselves, and may not represent software elements to receive and process touch data (or other inputs). Instead, touch data (or raw touch data) received by the viewer devices 12,14 are sent, via the Master software (as discussed herein), to the content renderer device 10, which determines, based on the location of the touch, whether it corresponds to an input to the GUI. If so, the Master App 60 in the renderer device 10 enhances (or supplements or reformats or translates) the touch data and sends it to the local software application as a control input on the line 120. Such enhanced or reformatted touch data may be simply translated coordinates from the device screen to the content renderer reference screen map or may be more sophisticated to identify a command or action of the device user based on the device touch location, such as "Button A pressed."

Also, in some embodiments, as shown in FIG. 3, the GUI elements 344,346 for the local software applications may be displayed on the local user devices 12,14 acting as viewers, but is not displayed on the content renderer on-air display device 10. This allows the on-air display device 10 to show a composite image with annotations but without GUI menu control elements being displayed, while allowing the talent to see and use the GUI control elements to enter their control inputs.

A similar situation to that described above for the local software apps GUI control elements 344,346 (FIGS. 3, 16) also applies to the Master App GUI display 700, described herein with FIG. 8.

The GUI control menu inputs for the local software apps 344,346 (FIGS. 3,16), or the Master App 700 (FIG. 8) may include animation controls (text, color selection, shape selection), video clip selection (e.g., scroll through video clips to select desired one), video clip controls (e.g., play, pause, stop, rewind), content input selection (e.g., on-line web browser access, web video apps, websites, local storage, network storage, other user devices, other inputs), video effects (e.g., filters, shading, rotation, gradient, masking, background, blurring, transformation, key, solid color, and other video effects), content routing (to or from the User Device), split screen controls, or any other controls described herein or needed to perform the functions described herein.

As described herein, different user devices can receive (and view) different on-screen GUI menu controls. Accordingly, different users can perform different control functions independently. The GUI menu controls for a given viewer user device may be selected by the user of the user device or by the content renderer or set by a GUI data map table (or database) showing all or a portion of the user devices and the corresponding GUI menu attributes for the associated user devices. In addition, if desired, a predetermined set of GUI menu controls may also be displayed on the On-Set or On-Air Display, Studio Monitor, or any other displays in the studio or on the network, which may be set using the setting for the local devices.

While the invention has been described as having embodiments using a common Master App software application in each peer device to perform the functions described herein, it should be understood that any other software, hardware, or firmware, or a combination thereof, and any other communication or networking configuration may be used provided the resulting system performs the functions described herein.

While certain embodiments herein have been described or refer to receiving, processing and sending "touch" data, the invention works equally well with devices that perform screen annotations or commands using a mouse, touch/mouse pad, light pen, or any other annotation or command input technique, all of which may be referred to herein as "touch" data, "raw touch" data, "user input" data, or "control" data. Also, if any of the user devices 10-16 are not touch-enabled devices, such as a laptop without touch capability, the touches sender logic 124 will bundle and send the appropriate data to identify user input events, such as pixel locations and values of the local display screen for mouse clicks, drags, etc., to the content renderer 10 (touches receiver logic 114).

A user input (or modification input) command typically begins with a user input (or modification input) action by the user of a user device, such as touching the screen, clicking a mouse or pressing a keypad button. Such an input action may be interpreted and formatted by the user device at various different levels, as discussed hereinbefore. For example, one of the lowest (most basic) levels is "state" data, indicating that a touch (or click) has occurred and the location of it on the screen, this may also be referred to herein as "raw" touch data. The state data (or raw touch data) may be translated or converted by the touch sender logic 124 (FIGS. 2,3,4) into higher level of information, such as a common command language or format (or standard data format) that is operating system independent (or agnostic), e.g., TUIO (Tangible User Interface Objects) or the like, prior to sending the touch data to the other device(s). If all the user devices have the same operating system, conversion to a common format may not be required. Also, the user input data sent to the other devices may be in any format, language or level of information, provided it can be properly interpreted by the receiving device to perform the functions described herein.

Also, the type of modification to the resulting display that the input modification action may cause includes may be any type of user input that the software application is able to receive (also referred to herein as an application control input), such as a video telestration, an annotation, a video edit, a video control (i.e., play, pause, fast forward, rewind, and the like, video control buttons on screen), a line drawing, dragging and dropping, a text character, an eraser, a highlighter, a solid line, a dashed line, an arrow, a circular shape image, a rectangular shape image, an animated blinking circle image, or any other modification or animation or control function capable of being received and processed by the device and the associated software application.

As discussed herein, a given device running the Master App software may toggle from one mode (or role) to another (i.e., a content provider to a content viewer/receiver, and vice versa) at any give time, depending on the GUI controls that have been activated by the device user or talent, or may act as both a renderer and viewer at the same time, as described herein.

In addition to the viewer devices 12-14 being connected to or communicating with the content renderer 10, other devices may be connected to or communicate with the content renderer 10, such as an external video or content source, as discussed herein. Examples of an external video source include a replay device, on-line web browser access, Internet video apps, websites, network storage, or any other form of content server. Also, the original "clean" image/video 337 (FIG. 3) may be provided to the content renderer 10 from such a source input if desired. Alternatively, the video may be stored on the content renderer 10 itself, rather than sourced from an external source, as discussed herein.

The content renderer 10 shown in FIG. 3 is a single device, however, the components of the content renderer 10 shown could reside on one or more different devices. For example, the Master App software for the content renderer 10 could run on a stand-alone computer connected to a content server in order to free up computing resources on the server. Additionally, as each peer device can operate as a content renderer or viewer, multiple peer content renderer devices could be used in some system configurations, as discussed herein.

Also, the various components or modules shown as being part of the Master App 60, such as the Touch Receiver, Touch Sender, Video Receiver, Video Sender, GUI Logic, Settings, and Communications I/O, may be part of the Master application or could be one or more separate executable components modules.

The present disclosure provides a system and method for touch control of display screens that are not possible to be controlled by touch (e.g., there is no touch input mechanism, or the display is inaccessible) or not practical to be controlled by touch in a manner that provides a good viewing experience to a viewer (e.g., talent must turn his/her back to the camera to interact with display screen). Such displays include stadium jumbotrons, virtual display screens, and display monitors that are physically inaccessible or do not include touch input capability. Embodiments of the invention described in the disclosure also allow multiple users (or talent) to control and annotate a display screen simultaneously through independent inputs.

The present disclosure allows a display screen such as a flat panel or large touch screen to be controllable by the talent (or users) by providing input on smaller personal touchscreens. This allows for one version of the content (without a GUI control menu) to be displayed to the viewers while another version (with the GUI control menus) to be displayed to and used by the talent for control on their personal touchscreens. If desired, the on-air display may also be touch-enabled and controlled by one of the on-air talent people. In that case, the GUI menu may still be (selectively) displayed on the on-air display. Alternatively, the on-air talent may be instructed on where to touch the screen to obtain the desired annotations on the on-air display. Such on-air display annotations would be in addition to the annotations by the other users (or talent) doing annotations on their respective the User Devices, and all composite annotations would appear on the on-air display as a composite annotated image, such as the composite annotated image 986 in the display 48 in FIG. 16.

The present disclosure provides a single common platform-agnostic software application (the Master App software) running on the user devices to coordinate simultaneous use of multiple different software applications, mixed media (such as a clean original image enhanced with annotation, telestration, or animation) running on multiple devices for live, on-camera (or on-air) use by talent (on-air users) via multiple user input devices (which may be touch capable, hence "multi-touch"). It provides the ability to combine annotations or other content from multiple tablets (or other user devices) as input devices for any given software application or multiple different applications. It allows multi-devices sharing a single application context for collaborative input to a content application. Further, it does not require the shared software application to be running on each peer device that is using or viewing the application, but only on a single device (such as the content renderer), while other peer devices can view and interact with the shared application as if it was running on their local device. In addition, the peer devices may each be running different operating systems from each other (or different versions thereof). It also provides for telestration on any and all applications, video clip browsing (including selecting clips and play-back controls), and routing content to/from devices.

The present disclosure provides a more visually pleasing on-air display by removing the need for GUI control menus to be displayed on the on-air display. Removal of on-air display GUI menus provides for less distraction by not having to keep track of limited visual control regions on the on-air display. In addition, on-air talent can face the camera instead of facing the on-air display with their back to the camera.

It also gives the on-air talent greater GUI control menu functionality. Talent can have more than one type of GUI controls on their local device screen and users can have individualized GUI layouts and selections. For example, an expert user may receive a GUI with a full complement of user control options, while a less experienced user may receive a GUI with fewer options, as indicated, such as via a user profile or Settings options. GUI controls can also be adapted to the application that is running automatically, which allows for switching between software applications on the fly or running multiple software applications at once. In addition, the GUI controls are visible and give visible feedback to the user.

Furthermore, the present disclosure provides a significant cost benefit by not requiring the on-air display (which may be very large, e.g., 80 inches or larger) to have touch screen input capability. This can significantly reduce the cost of the large screen. Also, the disclosure enhances accessibility, allowing talent to be able to annotate/interact with all portions of the displayed image/content. For example, if the on-air display is large, the on-air talent may not be able to reach all portions of the display, or if it extends too low, may require the talent to bend over to reach lower portions, or if the display elevated at a stadium (jumbotron) or other hard to access location, it may be completely inaccessible to the on air talent.

In addition, the present disclosure provides a unique high-speed seamless control of a large on-air display from a server on a content renderer, which is fed by multiple user (viewer) devices without any noticeable latency to the on-air talent that would be unacceptable for on-air use. In addition, the present disclosure does not require a third-party off-site service, the use of which would not be acceptable in a studio environment.

This also enables users located in different geographic locations to annotate or alter the content of the combined image/content of the on-air display and allows multiple users to interact with each other in one session together.

In addition, the present disclosure enables any display in the Master App network to be shown on any one or more other displays in the studio or other locations, using the GUI controls on a peer device (e.g., tablet or other device). This allows for easy replication and distribution of desired content seamlessly and quickly.

Further, as mentioned hereinbefore, the present disclosure allows devices/systems running different operating systems or versions thereof that are running different software applications to be used together (by multiple devices) and to be able to switch between them. For example, referring to FIG. 4, the device 16 may be running Microsoft® Windows® 7 operating system and have the Draft App running on it, the device 12 may be running Microsoft® Window® 95 operating system and have the Video Telestration app running on it, and the viewer device 10 may be a tablet or mobile digital device (such as an iPad or the like) running an Apple® operating system. Thus, it is platform (or operating system) agnostic. The Master App for each device is tailored or adjusts to the operating system touch interface and converts the touch inputs received from other devices to commands that can be interpreted by the local operating system, or converts local touch commands to common language/data format that can be interpreted by other device operating systems prior to sending to other devices.

Also, there are numerous standard protocols for touch (or user input) package description (e.g., TUIO (Tangible User Interface Objects), or the like), for video description (e.g., codecs wrappers, VP8 (video compression codec), WebM (open media file format), RDP (Remote Desktop Protocol), H264 (video encoding standard), JPEG 2000 (Joint Photographic Experts Group), RTP (Real-time Transport Protocol), RTSP (Real Time Streaming Protocol), or the like), and for messaging (e.g., XMP (Extensible Metadata Platform), ICE (Information and Content Exchange), or the like). Any of these may be used depending on the operating system and other system characteristics. Also, video scaling may be done by the viewer or the renderer, depending on the situation. The viewer can request a portion of the renderers image being viewed or the entire image, based on the viewer's system and the desired use of the image by the viewer (e.g., zoom, pan, or scan the image).

The present invention may also be used as a collaboration tool, where multiple users provide inputs or annotations to images/content from separate user input devices, which are combined simultaneously to provide a resultant compilation or combination or composite image/content 986 that may be shown on a common display screen/device 48, such as that shown in FIG. 16. In that case, multiple users in different locations may have their user inputs simultaneously combined by the content renderer 10 for display on their local devices 12,14 or on the common device display 48 (or portion thereof). For example, each remote participant may have a device 12,14 having a display window 979,983 showing their respective local inputs or annotations and may also have a composite window 977,981 showing the simultaneous combination or compilation of all or a predetermined set of user inputs from other peer devices. In that case, there may not be a single common display 48, only remote peer device displays. Alternatively, the common display 48 may be the display that holds the compilation image, which can be distributed to the various users, as directed by Master App Settings, the GUI menu selections, or other selection technique. The invention can be used for remote or partially remote collaboration, video conference, or for non-remote meeting collaboration where participants in the same room or building each provide input to a composite image/content which is viewed (or viewable) by the participants. For any of the embodiments discussed herein, the user devices may be located in different physical locations from each other.

The computers, servers, devices and the like described herein have the necessary electronics, software, memory, storage, databases, firmware, logic/state machines, microprocessors, communication links, displays or other visual or audio user interfaces, printing devices, and any other input/output interfaces to perform the functions described herein or achieve the results described herein.

Except where otherwise explicitly or implicitly indicated herein, process or method steps described herein are implemented within software modules (or computer programs) executed by one or more general purpose computers. For example, the web browsers and graphic user interfaces may be implemented on a computer using one or more software applications. Specially designed hardware could alternatively be used to perform certain operations. Process steps described as being performed by "talent" or "user" are typically performed by a human operator via a computer or an input device associated therewith, such as a mouse, touch pad, touch screen or the like.

Unless otherwise indicated herein, the devices or components shown herein may use or be connected by any communications network, such as the internet, or local area network, or wide area network, or a secured network or VPN, using any appropriate applications, e.g., web-enabled or Internet applications, such as the web browser, or any other client-server, peer-to-peer, master-slave or any other network topologies, configurations, applications or features or techniques to communicate with (or connect to) the various components or devices through a communications network.

In addition, the computers described herein may be any of a number of computing devices that are capable of communicating over a network and providing the functions described herein, including but not limited to: tablets, laptop computers, desktop computers, mobile phones, smart phones, intelligent monitors, electronic readers, digital media players, set-top boxes, personal digital assistants, and the like.

The protocols and components for providing communication between the various devices, computers, servers, hardware, or software described herein are well known to those skilled in the art of computer communications and thus, need not be described in more detail herein.

The data and computer executable instructions, programs, firmware, software and the like (also referred to herein as "computer executable components") described herein may be stored on a computer-readable medium that is within or accessible by the computers and the servers described herein, having sequences of instructions which, when executed by a processor (or CPU), cause the processor to perform all or a portion of the functions and methods described herein. Such computer executable instructions, programs, software and the like may be loaded into the memory of such computers or the servers, using a drive mechanism associated with the computer readable medium, such as a CD-ROM drive, DVD-ROM drive, network interface, floppy drive, or the like.

The number of screens shown or menu options shown should not in any way be limited to that shown in the drawings. The scope of the present disclosure is not limited in this regard as the system and method of the present disclosure can be utilized in connection with any number of screens and menu options within the scope of the disclosure herein.

Although the disclosure has been described herein using exemplary techniques, algorithms, or processes for implementing the present disclosure, it should be understood by those skilled in the art that other techniques, algorithms, processes or other combinations and sequences of the techniques, algorithms and processes described herein may be used or performed that achieve the same function(s) and result(s) described herein and which are included within the scope of the present disclosure.

Any process descriptions, steps, or blocks in flow diagrams should be understood as potentially representing modules, segments, or portions of code which include one or more executable instructions for implementing specific logical functions or steps in the process, and alternate implementations are included within the scope of the preferred embodiments of the systems and methods described herein in which functions may be deleted or executed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

At least the following is claimed:

1. A method for modifying a displayed video image, comprising:
   transmitting by a content renderer device a first video image to a renderer display;
   transmitting a supplemented video image by the content renderer device to at least one user device, the supplemented video image having the first video image and having selected GUI control graphics, the GUI control graphics displaying options to modify the first image;
   receiving by the content renderer device user input data from the at least one user device indicative of a corresponding modification of the first image to be displayed on a user display of the at least one user device;
   wherein the user input data indicative of the modification to be displayed being intercepted in realtime prior to the user device acting on the user input data, and being sent by the user device to the content renderer device in realtime;
   transmitting in realtime by the content renderer device a first modified video image to the renderer display, the first modified video image having the first video image and the modifications, and not having the selected GUI control graphics;
   transmitting in realtime by the content renderer device a second modified video image to the at least one user display, the second modified video image having the supplemented video image and the modifications;
   wherein the content renderer device and the user device each having a peer-sharing master software application that is adapted to provide user input data in realtime from the user device to the content renderer device and adapted to transmit the first and second modified video images from the content renderer device;
   wherein the user device receives and displays the second modified video image; and
   wherein a latency time between the user input data being received by the content renderer device and the user device display of the second modified video image is less than a predetermined acceptable latency time.

2. The method of claim 1, wherein the content renderer receives the user input data from a plurality of user devices and the first and second modified video images are indicative of a compilation of the modifications of the first video image on the user displays of the plurality of user devices.

3. The method of claim 2, wherein the peer sharing software application is device platform agnostic and at least two of the user devices are running different operating systems from each other.

4. The method of claim 1, further comprising translating, by the content renderer, the user input data into modification commands and wherein the first and second modified video images are based on the modification commands.

5. The method of claim 1, further comprising receiving the first video image by the content renderer.

6. The method of claim 1, wherein the user input data is indicative of at least one of: a screen touch, a mouse click, a mouse pad touch, a keyboard press, and a light pen press.

7. The method of claim 1, wherein the user input data comprises at least one of: state data, common language data, and command data.

8. The method of claim 1, wherein the modification comprises at least one of: a video telestration, an annotation, a video edit, a video control, an application control, a line drawing, dragging and dropping, a text character, an eraser, a highlighter, a solid line, a dashed line, an arrow, a circular shape image, a rectangular shape image, and an animated blinking circle image.

9. The method of claim 1 wherein the at least one user device is operating as a content viewer.

10. The method of claim 1 wherein the first video image is generated by an application running on the content renderer and wherein the video image from the application is displayed on the at least one user device and the application is running on the content renderer and not running on the user device.

11. The method of claim 10, wherein the application is capable of receiving user inputs to modify the first video image.

12. The method of claim 10, wherein the application comprises at least one of: a web browser application, a Video Telestration application, a word processor application, a presentation application, a spreadsheet application, a sports Draft application, and a video clip browser application.

13. The method of claim 1, further comprising:
   receiving a plurality of video images from a corresponding plurality of the user devices;

creating a compilation video image from each of the plurality of video images indicative of the combination of each of said plurality of video images; and causing the display of the compilation video image on the renderer display.

14. The method of claim 13, further comprising:

causing the display of a plurality of user device options associated with the video images from the corresponding user devices; and accepting the selection of at least two of the plurality of user device options for creating the compilation video image.

15. The method of claim 1, further comprising causing the display of at least one user device option associated with video images from a corresponding at least one user device; accepting the selection of the least one user device option as a selected video image; and causing, upon the selection of the device option, the first video image to become the selected video image.

16. The method of claim 1, wherein the predetermined acceptable latency time comprises one of: 1.0 seconds, 0.5 seconds, 0.25 seconds, and 0.1 seconds.

17. The method of claim 1, wherein the user input data is converted into common language data which is sent to the content renderer and wherein the common language data is independent of the operating system running on the user device.

18. The method of claim 1, wherein the peer sharing software application is device platform agnostic.

19. A non-transitory computer readable medium having a computer executable component for causing a computer system to perform a method, comprising:

transmitting by a content renderer device a first video image to a renderer display;

transmitting a supplemented video image by the content renderer device to at least one user device, the supplemented video image having the first video image and having selected GUI control graphics; receiving by the content renderer device user input data from the at least one user device indicative of modifications on a user display of the at least one user device;

wherein the user input data indicative of the modification to be displayed being intercepted in realtime prior to the user device acting on the user input data, and being sent by the user device to the renderer device in realtime;

transmitting in realtime by the content renderer device a first modified video image to the renderer display, the first modified video image having the first video image and having the modifications;

transmitting in realtime by the content renderer device a second modified video image to the at least one user device, the second modified video image having the supplemented video image and the modifications;

wherein the content renderer device and the user device each having a peer-sharing master software application that is adapted to provide user input data in realtime from the user device to the content renderer device and adapted to transmit the first and second modified video images from the content renderer device;

wherein the user device receives and displays the second modified video image; and wherein a latency time between the user input data being received by the content renderer device and the user device display of the second modified video image is less than a predetermined acceptable latency time.

20. A system for modifying and displaying a video image comprising:

a content renderer;

a renderer display;

a first user device;

a second user device; wherein:

the first and second user devices are adapted to receive user inputs and send state data in realtime reflecting the user inputs, to the content renderer, prior to the user device acting on the respective user inputs;

the content renderer is adapted to:

transmit a video image to the renderer display; and transmit the video image, supplemented with a graphical user interface, to the first and second user devices, the graphical user interface displaying to a user options for modifying the video image;

receive the state data reflecting the user inputs, based on options displayed by the graphical user interface, from the first and second user devices;

convert in realtime the state data to instructions for modifying the video image;

generate in realtime a modified video image based on the instructions;

transmit in realtime the modified video image, without the graphical user interface, to the renderer display; and transmit in realtime the modified video image supplemented with the graphical user interface, to the first and second user devices;

wherein the content renderer and the first and second user devices each having a peer-sharing master software application that is adapted to send in realtime the respective state data reflecting the user inputs from the respective user device to the content renderer and adapted to transmit the modified video image to the renderer display and to the first and second user devices;

wherein the first and second user devices each receives and displays the modified video image supplemented with the graphical user interface on a user display of the respective first and second user devices; and wherein a latency time between the user input data being received by the content renderer and the user device display of the modified video image supplemented with the graphical user interface, is less than a predetermined acceptable latency time.

\* \* \* \* \*